(12) United States Patent
Schönfeld et al.

(10) Patent No.: US 10,093,555 B2
(45) Date of Patent: Oct. 9, 2018

(54) COUNTER CURRENT FILTER APPARATUS FOR TREATMENT OR PURIFICATION OF WATER

(71) Applicant: Blücher GmbH, Ekrath (DE)

(72) Inventors: Raik Schönfeld, Hannover (DE); Jan Raiser, Essen (DE)

(73) Assignee: Blücher GmbH, Erkrath (DE)

( * ) Notice: Subject to any disclaimer, the term of this patent is extended or adjusted under 35 U.S.C. 154(b) by 250 days.

(21) Appl. No.: 14/777,178

(22) PCT Filed: Feb. 20, 2014

(86) PCT No.: PCT/EP2014/053289
§ 371 (c)(1),
(2) Date: Sep. 15, 2015

(87) PCT Pub. No.: WO2014/139770
PCT Pub. Date: Sep. 18, 2014

(65) Prior Publication Data
US 2016/0031722 A1  Feb. 4, 2016

(30) Foreign Application Priority Data

Mar. 15, 2013 (DE) .................. 10 2013 004 407
Mar. 20, 2013 (DE) .................. 10 2013 004 747
Apr. 19, 2013 (DE) .................. 10 2013 006 711

(51) Int. Cl.
| | |
|---|---|
| C02F 1/28 | (2006.01) |
| B01J 47/10 | (2017.01) |
| B01D 15/02 | (2006.01) |
| C02F 1/42 | (2006.01) |
| C02F 101/30 | (2006.01) |

(52) U.S. Cl.
CPC ............... *C02F 1/28* (2013.01); *B01D 15/02* (2013.01); *B01J 47/10* (2013.01); *C02F 1/281* (2013.01);

(Continued)

(58) Field of Classification Search
CPC ......... B01D 15/02; B01D 23/14; C02F 1/283; C02F 2301/04; C02F 1/28; C02F 1/281;
(Continued)

(56) References Cited

U.S. PATENT DOCUMENTS 3,436,343 A * 4/1969 Smith ............... C02F 1/283
210/189
4,202,770 A * 5/1980 Gappa ............... B01D 15/02
210/96.1
(Continued)

FOREIGN PATENT DOCUMENTS

DE  2306626 A1  1/1974
DE  2410007 A1  9/1974
(Continued)

*Primary Examiner* — Matthew O Savage
(74) *Attorney, Agent, or Firm* — Edward E. Sowers; Brannon Sowers & Cracraft PC

(57) ABSTRACT

The present invention relates to a method for treatment and/or purification of water, in particular wastewater or drinking water, preferably for the adsorptive removal of inorganically or organically-based, impurities, such as trace substances and/or micropollutants, wherein, in a counterflow filter device, e.g. a counterflow adsorption filter column, the water that is to be treated and/or that is to be purified firstly, and, secondly, an, in particular particulate, adsorption material are conducted in a counterflow direction. In particular, a procedure is followed in such a manner that the water to be treated and/or purified is passed through a bed of the adsorption material present in the counterflow filter device for the adsorptive removal of impurities and the bed is exchanged and regenerated by preferably continuous removal and supply of the adsorption material in counterflow to the water that is to be treated and/or that is to be purified.

19 Claims, 3 Drawing Sheets

(52) U.S. Cl.
CPC .............. *C02F 1/285* (2013.01); *C02F 1/283* (2013.01); *C02F 1/42* (2013.01); *C02F 2101/30* (2013.01); *C02F 2209/40* (2013.01); *C02F 2301/04* (2013.01); *C02F 2303/16* (2013.01)

(58) Field of Classification Search
CPC ........ C02F 1/285; C02F 1/42; C02F 2101/30; C02F 2209/40; C02F 2303/16; B01J 24/10
USPC .................................................. 210/189, 268
See application file for complete search history.

(56) References Cited

U.S. PATENT DOCUMENTS

| | | | | |
|---|---|---|---|---|
| 4,257,896 A | * | 3/1981 | Ikeda | ..................... B01D 15/02 210/268 |
| 4,279,755 A | * | 7/1981 | Himsley | ................... B01J 47/10 210/661 |
| 4,293,423 A | * | 10/1981 | Kosaka | .................... B01J 49/40 210/177 |
| 5,885,462 A | * | 3/1999 | Biver | ....................... B01J 47/10 210/266 |

FOREIGN PATENT DOCUMENTS

| | | | | |
|---|---|---|---|---|
| DE | 2436792 | A1 | 2/1976 | |
| DE | 1472528 | | 5/1977 | |
| DE | 3203181 | A1 | 8/1983 | |
| DE | 4000142 | A1 * | 7/1991 | .............. B09B 1/00 |
| DE | 19631650 | A1 | 2/1998 | |
| DE | 19834945 | A1 | 2/2000 | |
| DE | 202007014890 | U1 * | 4/2008 | ............. A61K 33/44 |
| DE | 202010009493 | U1 * | 4/2011 | ............. B01D 53/04 |
| EP | 0085779 | A1 | 8/1983 | |
| JP | 1428642 | | 3/1976 | |

* cited by examiner

COUNTER CURRENT FILTER APPARATUS FOR TREATMENT OR PURIFICATION OF WATER

CROSS-REFERENCES TO RELATED APPLICATIONS

This application is a National Stage filing of International Application PCT/EP 2014/053289, filed Feb. 20, 2014, entitled "COUNTERFLOW ADSORPTION FILTER COLUMN FOR WATER TREATMENT" claiming priority to German Applications DE 10 2013 004 407.3 filed Mar. 15, 2013; DE 10 2013 004 747.1 filed Mar. 20, 2013; and DE 10 2013 006 711.1 filed Apr. 19, 2013. The subject application claims priority to PCT/EP 2014/053289; to DE 10 2013 004 407.3; DE 10 2013 004 747.1; and DE 10 2013 006 711.1; and incorporates all by reference herein, in their entirety.

BACKGROUND OF THE INVENTION

The present invention relates to the technical field of the treatment of water, especially of wastewater or drinking water. More particularly, the present invention relates to the technical field of the treatment or purification of water in the drinking water or wastewater sector.

More particularly, the present invention relates to a method for treatment or purification of water (untreated water), especially of wastewater or drinking water, preferably for adsorptive removal of inorganic- or organic-based, especially organic-based, contaminants such as trace substances and/or micropollutants.

The present invention further relates to a purification plant, preferably for treatment or purification of water, especially of wastewater or drinking water.

The present invention additionally relates to a countercurrent filter apparatus, especially countercurrent adsorption filter column, which is equally suitable for treatment and purification of water, especially of wastewater or drinking water, and preferably for removal, especially adsorptive removal, of inorganic- or organic-based, especially organic-based, contaminants.

The present invention finally relates to the uses of the purification plant of the invention and of the countercurrent filter apparatus according to the invention, and also of specific adsorption materials in the method according to the invention for treatment or purification of water, especially wastewater or drinking water.

Increasing pollution of the aquatic environment, for example of surface water bodies, but also of groundwater and drinking water, constitutes a major environment-specific problem, especially since water in the form of drinking water is one of the most important and irreplaceable means of sustaining life. More particularly, the introduction of wastewater contaminated with contaminants into water systems and the deployment of contaminated sewage sludge or the like, for example on agricultural land, lead to corresponding contamination and pollution both of surface water and of groundwater.

A particular problem in this context is that of microcontaminants, for which another synonymous term is trace substances or micropollutants. These include not only industrial chemicals and flame retardants but especially also active pharmaceutical ingredients and human pharmaceuticals, such as analgesics, active hormone ingredients or the like, which are secreted in unchanged form or as conjugates or metabolites after chemical conversion in the human organism and, as a result, get into communal wastewater, for example. A further problem is that particular industrial chemicals such as plasticizers, especially bisphenol A, x-ray contrast agents such as amidotrizoic acid and iopamidol, surfactants, such as perfluorinated surfactants, pesticides and the like, since substances of this kind, even in small amounts, have a high toxic potential and/or low biocompatibility. Further examples of microcontaminants generally include antiknock agents such as methyl tert-butyl ether (MTBE).

In addition, what are called dissolved organic compounds or dissolved organic carbons (DOCs) may be cited, which may likewise be present as contaminants in water.

The aforementioned substances or substance classes especially have the feature in common that, even in the event of uptake of very small amounts in the μg or even in the ng range, they can have a considerable influence on the human organism, for example in terms of a hormonal effect, the endocrine disruptor character thereof, the development of resistances or the like.

Human pharmaceuticals, particularly because of the demographic transformation and rising individual life expectancy, with the associated increased consumption of medicaments, will get into the environment via communal wastewater pathways in an even greater amount and number in the future, which is similarly true of veterinary pharmaceuticals because of the general rise in meat consumption with the associated forms of animal keeping.

In addition, pharmacologically active substances which are used in veterinary medicine can similarly get into surface water bodies and into the groundwater, especially as a result of deployment of correspondingly contaminated slurry and subsequent leaching of the agricultural land fertilized thereby by precipitation, such that the corresponding microcontaminants can be flushed into water systems or into the groundwater.

Because of the toxicity, persistence and high bioaccumulation potential of microcontaminants or trace substances and the increasing use of such substances, there is a great need to minimize the introduction or release of microcontaminants into surface water bodies and into the groundwater, and a primary aim in this context should be considered that of effectively treating contaminated wastewater from domestic households, from industry and from medical facilities such as hospitals or other healthcare facilities in order to reduce the level of the corresponding microcontaminants. In this context, the purification of already contaminated drinking water, especially in the waterworks before feeding into the drinking water grid, is also of high relevance, especially since the microcontaminants in question, because of their increasing presence in the aquatic environment, are increasingly present or detectable in drinking water, sometimes in critical amounts.

This is because there may otherwise be unwanted release of the aforementioned substances through the sewage treatment plant effluent into surface water bodies and subsequently also into the groundwater, especially if the microcontaminants are not adequately removed from the original wastewater. Similarly, contaminated wastewater can otherwise get to the end user, which is similarly undesirable.

It can thus be stated in summary that trace substances or microcontaminants, especially in the form of medicaments, but also of industrial and industrial/mechanical origin, are present in wastewater to an increasing degree and can often also get into surface water bodies and into the groundwater as a result of often inadequate treatment or purification of the wastewater, which in turn results in an increased risk of contamination of drinking water, associated with a high endangerment potential for man and the environment.

Against this background, numerous approaches have been pursued in the prior art, which are intended to provide a basis for freeing contaminated water, especially contaminated wastewater or drinking water, of microcontaminants or trace materials, for which purpose plants using various filter apparatuses for wastewater treatment in sewage treatment plants on the one hand and for drinking water treatment on the other hand have been designed, particularly in waterworks. However, the known approaches for water purification do not always lead to the desired success.

Thus, one technical approach for reduction of microcontaminant or trace substance levels involves chemical breakdown of the microcontaminants present in untreated water by means of oxidation processes, the underlying methods generally being referred to as advanced oxidation processes (AOP). These include, for example, an ozone and/or UV treatment of the water to be treated. A disadvantage in the case of these methods, however, is the high energy costs that they often involve, the complex removal of residual ozone in the treated water and the unwanted formation of toxic metabolites or degradation products of the microcontaminants in question.

A further approach to purification of water in the prior art involves using membrane-based filter plants, in which case, for example, the principle of reverse osmosis (RO) and of nanofiltration (NF) and ultrafiltration (UF) is used. However, purifying concepts of this kind are associated with the disadvantage that sometimes complex and costly and also maintenance-intensive filter plants have to be designed and operated, the operation of the corresponding plants being accompanied by high energy costs in some cases. In addition, highly contaminated toxic residues often arise, the disposal of which constitutes a further logistical challenge. Other disadvantages are the sometimes low selectivity and the short operating times and/or service lives of the corresponding filter plants, it being possible for operation to be disrupted for a prolonged period, for example, by (micro-) biological growth on the membranes.

In addition, a further method for reducing the content of microcontaminants in water involves removing the microcontaminants from the water by means of conventional activated carbons. The corresponding concepts together with the technical implementation and the conventional activated carbons used for the purpose, however, are often disadvantageous in that the filter design in the prior art results in low filter capacities and similarly short operating times and/or service lives. Another problem is sometimes (micro-)biological growth in the filter units as such or on the activated carbons used, since this can lead to a reduction in the filter throughput or to a reduction in adsorption capacity.

Moreover, the conventional activated carbons used in the prior art often do not have adequate selectivity and have only low mechanical stability, which can lead to premature abrasion, especially with disadvantageous dust or sludge formation.

More particularly, the prior art often provides for the use of granular adsorptions, but these have a high proportion of binder, and of powdered charcoal, the charcoals used here being based, for example, on hard coal or on charcoals having coconut shells or pitch as starting material. Activated carbons of this kind are often neither mechanically stable nor satisfactory in terms of their adsorption properties, since they often have only a low adsorption capacity and selectivity. A further disadvantage of such activated carbons is that the corresponding industrial filter plants can become blocked as a result of sludge formation, for example on the basis of powdered charcoal or charcoal abrasion, which reduces the throughput capacity and hence the operating time and/or service life.

Moreover, the concepts realized in the prior art involving regeneration of spent activated carbon, i.e. that contaminated with contaminants, is often impossible or can be accomplished only with a high level of cost and inconvenience, especially using steam in a high-temperature process, accompanied by high energy costs and a loss of adsorptions, especially as a result of unwanted burnoff.

The industrial units and plants envisaged for the use of activated carbon are additionally often complex in terms of construction and lead to reduced efficiency in the overall filter assessment. Thus, the activated carbon adsorption stages known in the prior art, which are connected downstream of a mechanical treatment stage and a biological or chemical treatment stage, for example in the context of wastewater treatment, consist of a reaction tank on the one hand and a downstream sedimentation tank on the other hand, the activated carbon being added, especially in pulverulent form, to the reaction tank, and the activated carbon laden with contaminants being removed in the sedimentation tank, often using precipitants or flocculants. Regeneration of the spent charcoal component thus obtained is often impossible, and so the spent activated carbon has to be utilized thermally together with the sewage sludge. The merely thermal final utilization of spent activated carbon also worsens the carbon footprint and hence the overall environmental assessment of the underlying methods.

Plants of this kind for purification of water using conventional activated carbon additionally entail a high space demand, since the corresponding adsorption tanks are designed as open long-life filters which can have a length of more than 10 m. An additional factor is the use of large amounts of activated carbon, since the activated carbons used should be used the long-life filters in a bed having a height of 2 to 3 m, and so a total volume of 200 $m^3$ to 300 $m^3$ of activated carbon per tank is required.

A further approach to adsorptive treatment of water in the prior art involves using closed filter systems having activated carbon in the form of a bed or in a fixed bed. Systems of this kind can also be used, for example, as a downstream purification stage in the context of the treatment of drinking water. As stated above, however, these are filter systems having a closed design in relation to the adsorption material, such that no exchange of the activated carbon component is possible during the operation of the underlying filter plants. In this context, the prior art especially envisages percolation of the water to be purified, especially through a fixed bed filter or a bed of activated carbon based on closed pressure filters. A particular disadvantage here is that systems of this kind are exhausted quickly in terms of the substances to be adsorbed and hence only a limited filter capacity is present. Moreover, it is necessary to renew the entire adsorption material in the filter apparatus after the adsorption material has become exhausted, which results in shutdown of the filter element in question. To compensate for this, complex bypass connections or the use of parallel filter components is required, which makes plants of this kind complex in terms of construction and costly. Another particular disadvantage in this context is the high space demand of such plants.

The closed filter systems envisaged in the prior art, especially pressure filters, are additionally designed such that they have a tubular construction with a generally high diameter and great height, especially since, because of the closed filter arrangement, similarly large volumes of activated carbon are required in the filter system. Pressure filter systems of this kind often have a ratio of height to diameter in the range from about 2 to 3 or less, such that systems of this kind, for this reason too, have a high space demand and sometimes nonoptimal flow conditions within the filter.

Moreover, in the case of such filter concepts, only a limited height of the bed is possible, since, for technical reasons, significant headspace is required within the filter apparatus. More particularly, the closed filter systems of the prior art cited above have only a low height of the adsorption component within the filter and hence only a low adsorption height, the overall result of which is nonoptimal exploitation of the total filter volume. In this context, the prior art pressure filter systems described have a ratio of total column height or filter height to the height of the adsorption material in the filter of 5 to 10 or more.

Moreover, it is a requirement in the aforementioned plants or systems for the water to be purified to be free of suspended materials to a high degree, in order to prevent premature blockage of the filter system. In this regard, another disadvantage in relation to the prior art is that reprocessing or recycling of spent activated carbon is possible only to a very limited degree, one to two recycling runs at best being possible, the effect of which is likewise that large amounts of adsorptions used have to be replaced by new material. More particularly, this is also associated in the prior art with a high loss of activated carbon, which may be up to 25% of the original charge used, the losses in question being caused particularly by dust losses and burnoff. More particularly, efficient reactivation is often impossible.

The above-cited methods and plants using activated carbon as adsorption material allow batchwise exchange of the activated carbon at best, which leads to disadvantageous interruptions of operation and a reduction in efficiency.

Moreover, the aforementioned prior art systems are often inefficient in that satisfactory purification of water to be treated cannot be achieved, especially with regard to problem materials such as dissolved organic carbons (DOCs), perfluorinated surfactants such as perfluorooctanesulfonate (PFOS), antiknock agents such as methyl tert-butyl ether (MTBE), x-ray contrast agents such as iopamidol and amidotrizoic acid.

Furthermore, in relation to the prior art for the plants described therein, there are also unfavorable circulation factors, which represent the ratio of spent activated carbon and that being regenerated to the activated carbon present in the filter system and hence in use for the purposes of purification. In this context, in the prior art, the best conversion factors possible are of 100 or more, especially 200 to 300 or more.

Moreover, such prior art filter systems have relatively low superficial velocities or filtering rates of only 10 m/h at most, particularly in order to enable a certain purification efficiency at all in this way. However, this results in low volumes or amounts of purified water.

Because of the sometimes nonoptimal filter properties of the prior art systems, especially with regard to the closed pressure filters cited above, the result is generally relatively low specific water throughputs before the breakthrough of a trace substance. For example, in the case of prior art systems, the specific water throughput before the breakthrough of the trace substances amidotrizoic acid, given a starting concentration of 290 ng/L in the water for treatment, is about 25 $m^3$/kg of activated carbon.

DE 1 642 396 A1 relates to a method for treatment of wastewater, wherein suspended solids are first removed and wherein the sieved untreated water is treated with a flocculant and the supernatant water is separated from the flocculated material formed and passed through activated carbon beds. The activated carbon beds are back-flushed and regenerated periodically. According to this design, there is thus merely discontinuous or batchwise regeneration of the activated carbon, but this is unfavorable or disadvantageous from a process technology point of view, since the operating times are reduced or the installation of several parallel filter components is necessary as a result. Moreover, the back-flushing in particular is associated with sometimes high losses of adsorption material.

Moreover, DE 2 040 061 A1 relates to a plant for disinfection of wastewater, using disinfectants specific to this purpose. Reduction of microcontaminant levels is not possible on the basis of this design, and the use of disinfectants, moreover, is problematic from an environmental point of view. More particularly, batchwise operation of the plant with back-flushing of the filter element is envisaged, the intention being to remove what is called a return sludge from the apparatus in this way.

Furthermore, German utility model specification DE 88 15 345 U1 relates to a water treatment system, especially for treatment or provision of pollutant-free drinking water, wherein the water treatment system is equipped with a plate module which works by the principle of reverse osmosis. This design is disadvantageous in that the system is of comparatively low selectivity and has to be operated with high energy input, giving contaminated toxic residues.

Moreover, DE 10 2008 041 164 A1 relates to a method for treating water for removal of halide ions by oxidative halogenation of an organic compound added to the water, which is subsequently removed, with conversion of chlorate, iodate and bromate ions remaining in the water to the corresponding halide ions, which is to be followed by another oxidative halogenation. A method of this kind is complex in terms of the process and additionally inefficient in relation to a multitude of microcontaminants.

Finally, EP 1 044 982 A1 relates to a water treatment method which comprises the addition of ozone to untreated water and the filtering of the untreated water using an ozone-resistant membrane, with the option of further treatment of the filtrate with activated carbon or a reverse osmosis membrane. This purification, which is complex in terms of process technology, is sometimes costly and has not been optimized for continuous operation, especially with regard to the use of the activated carbon.

SUMMARY

Against this technical background, it is therefore an object of the present invention to provide an efficient method and corresponding plants or apparatuses for treatment or purification of water, such as wastewater or drinking water, wherein the above-outlined disadvantages of the prior art are to be at least substantially avoided or else at least mitigated.

More particularly, it is an object of the present invention to provide an efficient method and plants or apparatuses for this purpose, wherein particularly inorganic- or organic-based, especially organic-based, contaminants such as trace substances or microcontaminants are to be removed from the water for treatment or purification.

In this context—in a further object of the present invention—more particularly, an efficient system or an efficient plant having appropriate apparatuses, especially for performance of the method of the invention, is to be provided, the intention being to ensure high economic viability overall with simultaneously high purification efficiency, especially with regard to the operating time, the consumption of adsorptions for purification of the water to be treated and the energy input required. At the same time, continuous or uninterrupted operation of the plant or system and/or continuous or uninterrupted performance of the method is preferably to be ensured.

More particularly, it is a further object of the invention again to provide a corresponding system or purification plant, especially for performance of the method of the invention, by means of which the adsorbent for processing of the water to be treated can be used in an efficient and lasting manner, especially with regard to prolonged and uninterrupted operating times and service lives of the filter apparatuses used in this connection.

Moreover, in a further objective of the present invention, corresponding purification plants and apparatuses are to be provided, which shall also be optimized overall in terms of space and hence be space-saving overall and which shall have a high economic compatibility and an excellent ecological assessment overall.

The objective outlined above is achieved in accordance with the invention by the subject matter of method claims, which relates to the method of the invention for treatment or purification of water, especially of wastewater or drinking water, preferably for adsorptive removal of inorganic- or organic-based, especially organic-based, contaminants such as trace materials or microcontaminants; further advantageous developments and configurations of this aspect of the invention are the subject of the corresponding further independent method claims and dependent method claims.

The present invention further provides the purification plant of the invention, preferably for treatment or purification of water, as defined in the corresponding independent claims; further advantageous developments and configurations of the purification plant of the invention are the subject of the corresponding dependent claims.

The present invention additionally provides a countercurrent filter apparatus, especially countercurrent adsorption filter column, preferably for treatment or purification of water, as defined in the corresponding independent apparatus claim; further advantageous developments and configurations of the countercurrent filter apparatus of the invention are the subject of the respective dependent apparatus claims.

Finally, the present invention in turn further provides for the use of the purification plant of the invention or of the adsorption material used in the context of present invention, and of the countercurrent filter apparatus of the invention in the method of the invention for treatment or purification of water according to the description herein.

It will be appreciated that configurations, embodiments, advantages and the like that are cited hereinafter for just one aspect of the invention for the purpose of avoiding repetition do of course also apply correspondingly in relation to the other aspects of the invention.

Furthermore, it will be appreciated that, in the case of values, numbers and ranges stated hereinafter, the ranges stated should not be understood in a restrictive manner; it will be apparent to the person skilled in the art that, depending on the individual case or based on the application, it is possible to deviate from the stated ranges and figures, without leaving the scope of the present invention.

Moreover, all the values and parameters stated hereinafter, or the like, can be determined or ascertained in principle by standardized or expressly specified determination methods, or else by determination methods familiar per se to those skilled in the art.

With these provisions, the present invention is described in detail hereinafter.

DETAILED DESCRIPTION OF THE INVENTION

Figure 1:
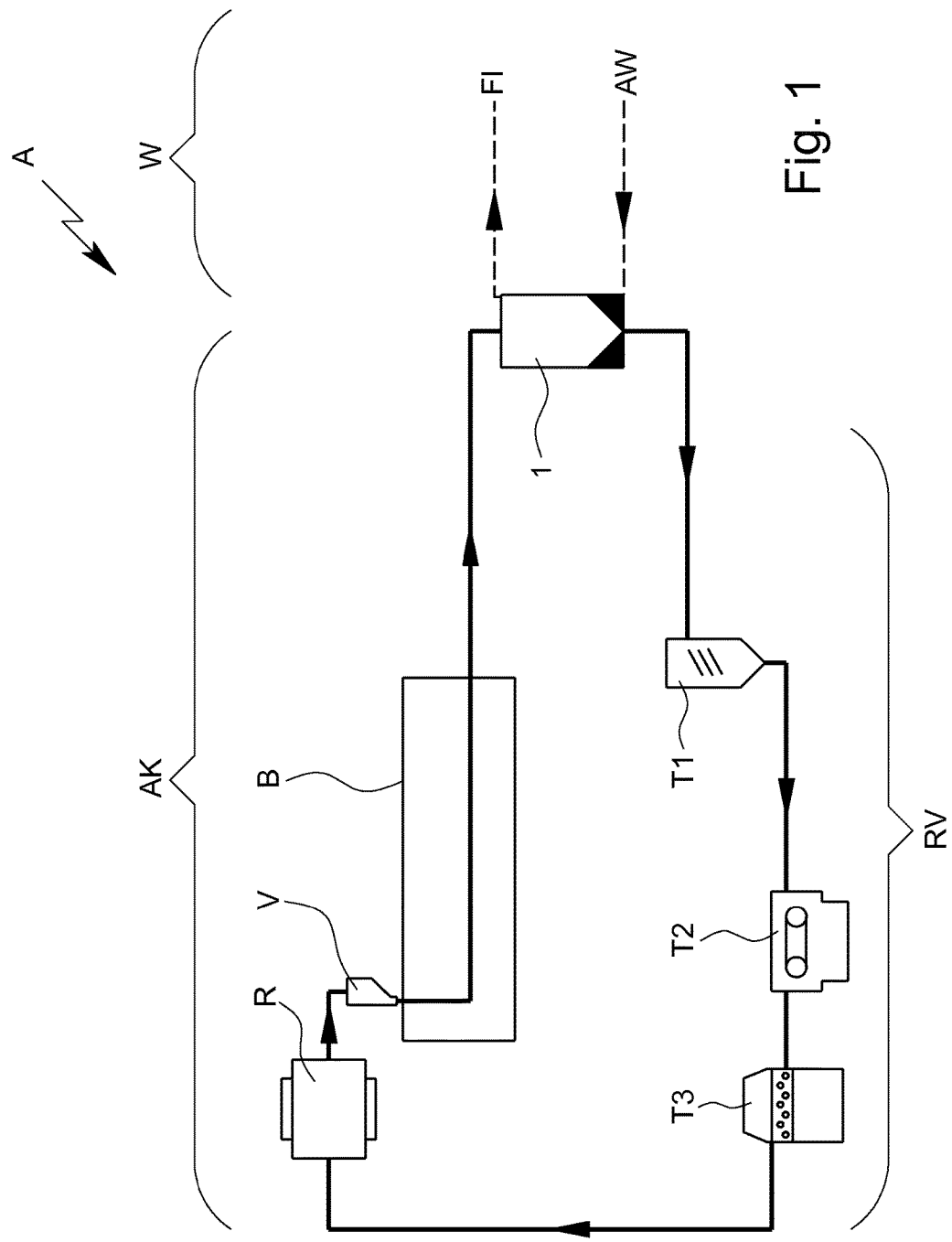
FIG. 1 provides a schematic diagram or overview of the purification plant A of the invention, preferably for treatment or purification of water or untreated water AW, preferably for adsorptive removal of inorganic- or organic-based, especially organic-based, contaminants such as trace materials and/or micropollutants, in one embodiment of the invention.

The present invention thus provides—in a first aspect of the present invention—a method for treatment and/or purification of water, especially of wastewater or drinking water, preferably for adsorptive removal of inorganic- or organic-based, especially organic-based, contaminants such as trace substances and/or micropollutants. It is a feature of the method of the invention that, in a countercurrent filter apparatus, especially countercurrent adsorption filter column, the water to be treated and/or purified on the one hand and an adsorption material, especially a particulate adsorption material, on the other hand are conducted in countercurrent and/or in opposite directions to one another, especially in such a way that the water to be treated and/or purified is passed through a bed of the adsorption material present in the countercurrent filter apparatus for adsorptive removal of contaminants and the bed is exchanged and regenerated by preferably continuous removal and supply of the adsorption material in countercurrent to the water to be treated.

In the context of the present invention, in a particularly preferred embodiment of the invention, it may be the case that the adsorption material is conducted and/or introduced, especially continuously, into the countercurrent filter apparatus. In addition, in this context, the adsorption material may especially be conducted continuously out of and/or removed continuously from the countercurrent filter apparatus.

In a further, particularly preferred embodiment of the invention, it may additionally be the case that the adsorption material which has been conducted out of and/or removed from the countercurrent filter apparatus and/or laden with the contaminants, is sent to and/or subjected to a regeneration and/or recycling operation, especially a continuous and/or especially a thermal regeneration and/or recycling operation. In this way, it is especially possible to remove or desorb the contaminants which have been taken up or adsorbed by the activated carbon beforehand, so as to result in a regenerated or unused or unladen or fresh adsorption material. More particularly, the regenerated or unused or unladen or fresh adsorption material may be conducted and/or introduced, especially continuously, back into the countercurrent filter column.

The wording "conduct in countercurrent and/or in opposite directions to one another", as used in the context of present invention, should especially be understood so as to mean that, in relation to the water to be treated or purified on the one hand and the adsorption material on the other hand, there is a respective mass transfer or mass flow in the manner of a countercurrent principle, i.e. in opposite directions of the respective mass transfers or mass flows relative to one another; more particularly, the water to be treated or purified on the one hand and the adsorption material on the other hand are in direct contact with one another in the countercurrent filter apparatus or in the adsorption or countercurrent zone (which can also be referred to synonymously as mass transfer zone) of the countercurrent filter apparatus, and so, as a result, substances present in the water can be taken up or adsorbed by the adsorption material, said substances especially being the contaminants present in the water to be treated or purified, such as trace substances or microcontaminants. The water to be treated or purified on the one hand and the adsorption material on the other hand thus flow in opposite directions to one another according to the inventive design, with into the respective (main) flow directions opposed to one another at least essentially by 180°.

More particularly, in general, the water to be treated or purified, in the operating state or use state of the countercurrent filter plant, flows from the water entry region through the adsorption or countercurrent zone to the or into the water exit region of the countercurrent filter plant, whereas the adsorption material flows or is transported from the water exit region through the adsorption or countercurrent zone to the or into the water entry region of the countercurrent filter plant.

In this context—in a preferred embodiment of the invention, according to which the countercurrent filter apparatus used in the method of the invention, based on the longitudinal axis thereof, is operated in vertical arrangement or positioning—the water is introduced into a lower end or into a water entry region disposed at the lower end of the countercurrent filter apparatus, while the adsorption material is introduced into an upper end of the countercurrent filter apparatus, which simultaneously defines a water exit region. Within the countercurrent filter apparatus, the result, in this embodiment, in relation to the water, is thus a flow direction from the bottom upward so to speak, with removal of the purified water or the resulting filtrate from the countercurrent filter apparatus at the upper end, while, in relation to the adsorption material, there is a flow direction from the top downward so to speak in the countercurrent filter apparatus, the adsorption material laden with the contaminants then being removed from the countercurrent filter apparatus at the lower end.

In the context of the method of the invention, the procedure may especially be such that the water to be treated or purified is transported into the countercurrent filter apparatus under pressure, for example by means of (compression) pump apparatuses, or that the water or filtrate which has been purified or freed of the contaminants is removed from the countercurrent filter apparatus with application of a reduced pressure, for example using (suction) pump apparatuses. In addition, the adsorption material can be introduced into the countercurrent filter apparatus, for example by means of pressurization, and/or removed from the countercurrent filter apparatus by means of application of reduced pressure using appropriate pump apparatuses.

In this connection, in relation to the adsorption material, the pressure at the introduction site into the countercurrent filter apparatus should be greater than the corresponding opposing pressure in the countercurrent filter apparatus or in the adsorption and/or countercurrent zone. Similarly, the pressure at the exit site of the adsorption material should be such that the pressure in the countercurrent filter apparatus or in the adsorption and/or countercurrent zone is greater than the pressure in the region that follows on from or is downstream of the exit site. For the feed of the (untreated) water to be treated or purified, it is correspondingly the case that the feed pressure of the water is preferably greater than the pressure in the countercurrent filter apparatus or in the adsorption and/or countercurrent zone, or that the pressure in the region that follows on from the countercurrent filter apparatus or the region of the water drain arranged downstream thereof is lower than the corresponding pressure in the countercurrent filter apparatus or the adsorption and/or countercurrent zone.

With regard to the transport of the adsorption material in the countercurrent filter apparatus or in the adsorption and/or countercurrent zone, the latter may firstly be caused and/or supported by the corresponding pressurization or application of reduced pressure, especially as outlined above. It may likewise especially be the case in accordance with the invention that the corresponding transport of the adsorption material within the countercurrent filter apparatus or in the adsorption and/or countercurrent zone is effected as a result of or by virtue of support by gravity, i.e. to a certain degree by virtue of the height of the bed itself, especially if the countercurrent filter apparatus is arranged vertically with respect to its longitudinal axis, accompanied by the mass transfer or mass flow of the adsorption material from the top downward, so to speak.

The fundamental idea of the present invention is especially that the method of the invention is conducted in a very specific countercurrent filter apparatus as described in detail hereinafter, wherein, in relation to the transport or flow of the water to be treated or purified, the adsorption material used for purification of the water is transported in the opposite direction thereto or flows in the opposite direction thereto, and so the water flow on the one hand and the transport or flow of the adsorption material or the adsorption material stream on the other hand are in countercurrent to one another in the countercurrent filter apparatus. The water to be purified on the one hand and the adsorption material on the other hand are thus conducted or contacted with one another in opposite transport or flow directions in the countercurrent filter apparatus used in accordance with the invention.

The adsorption material used in accordance with the invention, within the countercurrent filter apparatus, especially in the form of a loose bed or in the form of a moving bed and/or in the form of a (loose) moving bed, from which, especially on the feed side of the water to be treated or purified, spent adsorption material is especially withdrawn or drawn off continuously, and to which, on the exit site of the purified water or filtrate, regenerated or unused adsorption material is added again, so as to result in the above-described opposing transport process of the adsorption material in relation to the water to be treated or purified.

Because of this very specific procedure, it has completely surprisingly been possible to significantly increase both the service life or use life and hence the operating time of the countercurrent filter apparatus used in the context of the method of the invention and the purifying action in relation to the untreated water to be purified. This is because, because of the inventive design, with the underlying countercurrent principle and the removal and supply, especially continuous removal and supply, of adsorption material, there is, so to speak, no occurrence of exhaustion of the countercurrent filter apparatus or of the bed present in the countercurrent filter apparatus, which considerably prolongs the operating periods and enables continuous operation, since the underlying apparatus or plant can effectively be operated without interruption or time limitation.

More particularly, the contrary or opposing transport of adsorption material on the one hand and of water to be treated or purified on the other hand (i.e. the contrary flow of the water to be treated or purified through the bed of the adsorption material or the stream of the adsorption material) significantly increases the filter efficiency in relation to the removal of the above-cited trace substances or microcontaminants, since—without wishing to be restricted to this theory—the water to be purified or treated is always in contact to some degree with non-exhausted or regenerated or unladen or fresh adsorption material. For this reason too, it is possible in accordance with the invention to achieve high superficial velocities or filtering rates or throughputs in relation to the water to be treated or purified, such that the overall result is an extremely efficient and high-performance method according to the invention (which is also enabled in apparatus terms by the specific configuration of the plant of the invention and the apparatus of the invention), it being possible in this context, as will be stated hereinafter, to achieve superficial velocities or filtering rates which may sometimes be more than 50 m/h.

The present invention is based, as stated above, on a procedure or technique whereby the adsorbent used or the adsorbents is/are conducted, especially continuously, through the countercurrent filter apparatus or countercurrent adsorption column used in the context of the method of the invention.

Because of the permanent exchange of adsorption material within the countercurrent filter apparatus, a further advantage of the present invention is considered to be that suspended particles or solid particles that are sometimes present in the untreated water are not critical. As a result of the continuous or permanent removal of adsorption material, the bed does not become too dense within the adsorption or countercurrent zone. More particularly, by virtue of the permanent removal and addition of adsorption material, no interruption of the water purification is necessary either. More particularly, there is no need for any complex backflush operations for removal of spent adsorption material.

Moreover, the adsorption material used in accordance with the invention, which is described in detail hereinafter, with the correspondingly high adsorption capacities and the high selectivity, achieves the effect in accordance with the invention that the amounts of adsorption material used are relatively low or small, which also enables corresponding regeneration of the adsorption material used on site to some degree, and hence within a single plant having both apparatuses for water treatment on the one hand and for regeneration of the adsorption material on the other hand. The regeneration of the adsorption material, in the context of the present invention, is thus integrated into the technological concept and enables development of the overall process on site in the form of a circuit, especially a closed circuit, without the need to replace significant amounts of adsorption material with new material.

More particularly, the countercurrent filter apparatus of the invention, as also used in the method of the invention, has a small construction size, not least because of the use of highly efficient adsorption material, since the amounts of specific adsorption material are much lower than the corresponding amounts which have to be used in the case of prior art purification methods, and since, in relation to the countercurrent filter apparatuses according to the invention, high filtering rates result or are enabled by virtue of the construction as well. As a result of the optimized construction size, the countercurrent filter apparatus according to the invention, which is used in the context of the method of the invention, can be implemented in an overall apparatus or in the purification plant according to the invention with a low space demand overall.

With regard to the present invention, moreover, the term "continuous" as used in the context of the present invention should be understood in a very broad manner, and relates particularly to an embodiment of the method of the invention whereby especially the addition and withdrawal of the adsorption material to the and from the countercurrent filter apparatus are effected essentially without interruption (in time). The term in question, however, also encompasses a procedure whereby there are interruptions, especially short interruptions, in the addition or withdrawal of the adsorption material. The same applies to the addition and withdrawal of water, which should especially be effected in a similarly continuous manner, i.e. essentially without interruption (in time), although there may also be interruptions, especially short interruptions, of addition and withdrawal in relation to the water to be treated or purified. With regard to any interruptions, especially short interruptions, in the respective transport operations of adsorption material and water, these may be coordinated independently of one another or with respect to one another, or dependently on one another. For example, the transport of water may be stopped, especially for a brief period, for withdrawal or addition of the adsorption material, and vice versa. As stated above, however, an at least essentially uninterrupted procedure is preferable in accordance with the invention, both with regard to the adsorption material and the water. Overall, in accordance with the invention, the method procedure is one which enables an at least essentially permanent and/or at least essentially uninterrupted purification of the water to be treated or purified.

In addition, a further basic idea behind the present invention is to subject the adsorption material used in the context of the present invention, which is, as described hereinafter, especially a specific activated carbon in grain or bead form, preferably to a regeneration or desorption, especially a continuous regeneration or desorption, especially a thermal regeneration or desorption, such that adsorption material which is contaminated or laden with the contaminants and has been withdrawn from the countercurrent filter apparatus is subjected to a regeneration, especially a thermal regeneration, for removal or desorption of the contaminants adsorbed beforehand, it being possible to feed the purified adsorption material or the adsorption material freed of contaminants or the unladen or regenerated adsorption material obtained in this way back to the countercurrent adsorption filter column.

In this way, in accordance with the invention, the performance and efficiency of the method of the invention is increased further, especially associated with a reduction in costs, since the adsorption material can be recycled or reused to some degree—and without stopping the operation of the plant or apparatus of the invention.

Because of the use of specific adsorption materials, especially based on synthetic raw materials and/or starting materials or preferably based on activated carbon, especially as defined hereinafter, it is possible to conduct a large number of recycling or regeneration operations with a low material loss, such that the adsorption material used can be used for a long period or for numerous purification steps.

On the basis of the withdrawal, envisaged in accordance with the invention, of adsorption material laden with contaminants from the countercurrent filter apparatus, and the subsequent regeneration and feedback into the countercurrent filter apparatus, so to speak, a closed adsorption material circuit with alternating or successive loading of the adsorption material on the one hand and regeneration or desorption of the pollutants or trace substances taken up previously on the other hand is enabled in the context of the present invention. Similarly, however, it is also possible in principle, in the context of present invention, to replace at least a portion of the adsorption material with new adsorption material, such that a particular proportion of the adsorption material used can be removed from the process cycle—for example continuously, but also batchwise—and replaced by new adsorption material.

A further central advantage of the method of the invention is considered to be that the method according to the invention can be used universally to some degree, or can be matched individually or tailored in relation to the respective purification requirements. Thus, the method of the invention can be used for treatment or purification of wastewater, especially communal wastewater, hospital wastewater and industrial wastewater or the like, but also for purification of drinking water.

With regard to the countercurrent filter apparatus used in the context of the method of the invention, this can especially be configured according to one or more features of the countercurrent filter apparatus of the invention defined hereinafter. In the context of the method of the invention, a very specific countercurrent filter apparatus in particular is thus used, and this, because of its specific apparatus construction, enables the contrary transport of water to be treated or purified on the one hand and adsorption material on the other hand that underlies the method of the invention. In this regard, reference may especially be made to the remarks which follow in relation to the countercurrent filter apparatus of the invention.

In this connection, the countercurrent filter apparatus used in the context of the method of the invention—in an embodiment preferred in accordance with the invention—may have at least one housing, said housing having at least one adsorption and/or countercurrent zone and at least one water entry region and at least one water exit region.

More particularly, the adsorption and/or countercurrent zone, in terms of flow, may be disposed between the water entry region and the water exit region. In addition, the adsorption and/or countercurrent zone should be disposed downstream of the water entry region and upstream of the water exit region, based on the flow direction of the water.

More particularly, the water entry region should have at least one adsorption material outlet. In addition, the water exit region should have at least one adsorption material inlet.

Because of this specific apparatus design, the opposing flow or the opposing transport of water to be treated or purified on the one hand and adsorption material on the other hand is ensured, especially since the water on the one hand and the adsorption material on the other hand are introduced into the countercurrent filter apparatus and withdrawn therefrom at different or opposite ends in the countercurrent filter apparatus.

Specifically, the countercurrent filter apparatus which is used in the context of the method of the invention should thus firstly have at least one water entry region, especially having at least one water feed and/or at least one adsorption material outlet, and secondly at least one water exit region, especially having at least one water drain and/or at least one adsorption material inlet, and at least one adsorption and/or countercurrent zone disposed, in terms of flow, between the water entry region and the water exit region. In the context of the procedure of the invention, the (untreated) water to be treated or purified is thus conducted through the bed of the adsorption material, especially in the adsorption and/or countercurrent zone of the countercurrent filter apparatus, in countercurrent to the adsorption material to obtain treated or purified water, followed by removal of the treated or purified water thus obtained, especially filtrate, from the countercurrent filter apparatus.

In this connection, the water to be treated, in the context of the procedure of the invention, should be conducted and/or introduced, especially continuously, into the water entry region, especially through the water feed, into the countercurrent filter apparatus. In addition, the treated or purified water, especially the filtrate, should be conducted and/or removed, especially continuously, from the countercurrent filter apparatus in the water exit region, especially through the water drain.

In this connection, it may likewise be the case in accordance with the invention that the adsorption material is conducted and/or introduced into the countercurrent filter apparatus, especially continuously, in the water exit region, especially through the adsorption material inlet. In this context, the adsorption material should be conducted out of and/or removed, especially continuously, from the countercurrent filter apparatus in the water exit region, especially through the adsorption material outlet.

More particularly, in the context of present invention, the water to be treated and/or purified on the one hand and the adsorption material on the other hand in the countercurrent filter apparatus, especially in the adsorption and/or countercurrent zone, have at least essentially opposing flow directions. More particularly, the procedure in accordance with the invention is such that the water to be treated and/or purified on the one hand and the adsorption material on the other hand flow and/or are contacted with one another in opposite directions and/or in countercurrent to one another in the countercurrent filter apparatus, especially in the adsorption and/or countercurrent zone. This results in an efficient removal of the contaminants in question, especially trace materials or micropollutants, from the (untreated) water to be treated or purified to obtain the treated or purified water or filtrate, the contaminants being taken up or adsorbed by the adsorption material.

In the context of a preferred embodiment of the invention, the water to be treated and/or purified is conducted and/or introduced, especially continuously, into the countercurrent filter apparatus, especially under pressure. More particularly, the water to be treated and/or purified should be conducted and/or introduced into the countercurrent filter apparatus in the water entry region, preferably through the water feed.

More particularly, in the context of the method of the invention, the procedure is such that the water to be treated or purified which is conducted or introduced into the countercurrent filter column is conducted through an adsorption or countercurrent zone of the countercurrent filter apparatus disposed downstream of the water entry region of the countercurrent filter apparatus, based on the flow direction of the water. In this case, more particularly, the water to be treated and/or purified is contacted with the adsorption material in the adsorption and/or countercurrent zone. More particularly, in accordance with the invention, the water to be treated and/or purified on the one hand and the adsorption material on the other hand have at least essentially opposite flow directions. More particularly, the water to be treated or purified on the one hand and the adsorption material on the other hand flow in opposite directions and/or in countercurrent to one another in the adsorption and/or countercurrent zone.

According to the invention, more particularly, the procedure is such that the water to be treated and/or purified, especially after passing through and/or flowing through the adsorption and/or countercurrent zone of the countercurrent filter apparatus, is conducted out of or removed from the countercurrent filter apparatus in a water exit region disposed downstream of the water entry region of the countercurrent filter apparatus and/or downstream of the adsorption and/or countercurrent zone of the countercurrent filter apparatus, based on the flow direction of the water, especially through a water drain. This is especially the treated or purified water, or the water or filtrate which has been freed of the contaminants, especially trace materials and/or micropollutants.

In the context of the present invention, because of the specific method procedure, especially using a specific purification plant or countercurrent filter apparatus, high superficial velocities or filtering rates can be achieved, which significantly increases the filter efficiency. Thus, in the context of present invention, a superficial velocity and/or filtering rate, calculated as the quotient of volume flow rate [$m^3/h$] and cross-sectional area [$m^2$] and based on the water to be treated and/or purified, of at least 10 m/h, especially at least 20 m/h, preferably at least 25 m/h, more preferably at least 30 m/h, is established in the adsorption and/or countercurrent zone of the countercurrent filter apparatus.

More particularly, in accordance with the invention, the procedure may be such that a superficial velocity and/or filtering rate, calculated as the quotient of volume flow rate [$m^3/h$] and cross-sectional area [$m^2$] and based on the water to be treated and/or purified, in the range from 10 m/h to 120 m/h, especially 20 m/h to 100 m/h, preferably 25 m/h to 80 m/h, more preferably 30 m/h to 70 m/h, especially preferably 40 m/h to 60 m/h, is established in the adsorption and/or countercurrent zone of the countercurrent filter apparatus.

With regard to the method of the invention, moreover, more particularly, the adsorption material is fed at least essentially continuously to the countercurrent filter apparatus. More particularly, the adsorption material should be conducted at least essentially continuously through the countercurrent filter apparatus. In addition, the adsorption material should be withdrawn at least essentially continuously from the countercurrent filter apparatus. In this connection, the amount of adsorption material added per unit time or the volume of adsorption material added per unit time should correspond at least essentially to the amount of adsorption material withdrawn per unit time or the volume of adsorption material withdrawn per unit time. In this way, an at least essentially constant amount or a constant volume of adsorption material in the countercurrent filter apparatus and, as a result of this, an at least essentially constant height of the bed, especially the loose bed, of the adsorption material in the countercurrent filter apparatus is ensured.

In addition, the adsorption material should be conducted and/or introduced into the countercurrent filter apparatus in a water exit region, preferably through an adsorption material inlet, of the countercurrent filter apparatus.

More particularly, the adsorption material conducted and/or introduced into the countercurrent filter column should be conducted through an adsorption and/or countercurrent zone of the countercurrent filter apparatus disposed upstream of the water exit region of the countercurrent filter apparatus, based on the flow direction of the adsorption material. In this connection, the adsorption material should be contacted in the adsorption and/or countercurrent zone with the water to be treated and/or purified. More particularly, the adsorption material on the one hand and the water to be treated and/or purified on the other hand should have at least essentially opposite flow directions. In this connection, the adsorption material on the one hand and the water to be treated and/or purified on the other hand should flow in opposite directions and/or in countercurrent to one another and/or be contacted with one another in the adsorption and/or countercurrent zone.

As stated above, it is particularly advantageous in accordance with the invention when the adsorption material in the countercurrent filter apparatus, especially in the adsorption and/or countercurrent zone of the countercurrent filter apparatus, is in the form of a bed, especially a loose bed.

In addition, it may be the case in accordance with the invention that the adsorption material, especially after passing through and/or flowing through the adsorption and/or countercurrent zone of the countercurrent filter apparatus, is conducted out of and/or removed from the countercurrent filter apparatus in a water entry region disposed downstream of the water exit region of the countercurrent filter apparatus and/or downstream of the adsorption and/or countercurrent zone of the countercurrent filter apparatus, based on the flow direction of the adsorption material, especially through an adsorption material outlet.

A further central advantage of the procedure of the invention is additionally that optimized specific mass throughputs can be achieved, in that a relatively small amount of adsorption material leads to a large volume of purified water or filtrate.

In this connection, it may especially be the case that a specific mass throughput, calculated as the quotient of mass throughput of adsorption material in the countercurrent filter apparatus [g/h] and volume of treated and/or purified water and/or filtrate produced [$m^3$], in the range from $10^{-7}$ g/h·$m^3$ to 1000 g/h·$m^3$, especially $10^{-6}$ g/h·$m^3$ to 100 g/h·$m^3$, preferably $10^{-5}$ g/h·$m^3$ to 10 g/h·$m^3$, is established.

In addition, it may especially be the case in accordance with the invention that an exchange (i.e. replacement of adsorption material laden with contaminants with regenerated or unladen or fresh adsorption material) in the range from 0.1% to 90% by weight, especially 0.5% to 80% by weight, preferably 1% to 70% by weight, more preferably 1.5% to 60% by weight, especially preferably 2.5% to 55% by weight, most preferably 5% to 50% by weight, is conducted in the countercurrent filter apparatus, based on the volume of the adsorption material in the bed, especially the loose bed, and based on a period of 24 h. In this way, it is likewise ensured that non-exhausted or regenerated adsorption material is present in the bed in a sufficient amount for treatment or purification of the untreated water. As a result of the continuous exchange of the adsorption material, the bed in the countercurrent filter column is effectively not exhausted.

With regard to the adsorption material used in the context of the method of the invention, the adsorption material may be selected from the group of particulate, especially spherical, adsorption materials. Adsorption materials of this kind have particularly good characteristics in the bed, especially with regard to the flow characteristics of the water to be treated or purified, but also the transport of the adsorption material in the bed itself.

More particularly, the adsorption material may be selected from the group of
(i) activated carbon, especially granular activated carbon, preferably spherical activated carbon and/or especially activated carbon in the form of PBSAC (polymer-based spherical activated carbon);
(ii) zeolites, especially natural and/or synthetic zeolites;
(iii) molecular sieves, especially zeolitic molecular sieves, synthetic molecular sieves and/or especially synthetic molecular sieves based on carbon, oxides and/or glasses;
(iv) metal oxide and/or metal particles;
(v) ion exchange resins, especially polydisperse and/or monodisperse cation and/or anion exchangers, especially of the gel type and/or of the macroporous type;
(vi) inorganic oxides, especially silicon dioxides, silica gels and/or aluminum oxides;
(vii) porous organic polymers and/or porous organic-inorganic hybrid polymers and/or porous organic-inorganic hybrid polymers and/or metal-organic framework materials, especially MOFs (metal-organic frameworks), COFs (covalent organic frameworks), ZIFs (zeolite imidazolate frameworks), POMs (polymer organic materials) and/or OFCs;
(viii) mineral granulates;
(ix) clathrates; and
(x) mixtures and/or combinations thereof.

In a manner which is preferable in accordance with the invention, the adsorption material may be formed from activated carbon, especially from granular, preferably spherical, activated carbon.

The respective adsorption materials which can be used in the context of the method of the invention are well known as such to those skilled in the art, and the person skilled in the art is capable at any time of selecting the particular adsorption material in the light of the procedure of the invention in accordance with the present details, especially for assurance of a high adsorption efficiency and the regeneration, especially the thermal regeneration, envisaged in accordance with the invention.

Activated carbons usable in accordance with the invention, which can especially be used on the basis of particulate or spherical activated carbon, are obtainable, for example, from Blücher GmbH, Erkrath, Germany, or from AdsorTech GmbH, Premnitz, Germany. In addition, in relation to the activated carbon usable in accordance with the invention, reference may be made to the applicant's own European patent application EP 1 918 022 A1 and to the parallel US 2008/017589 A1, the respective disclosures of which are hereby fully incorporated by reference. More particularly, the activated carbon used in accordance with the invention can be obtained by carbonization of starting materials or polymers, especially synthetic starting materials or polymers, with subsequent activation. The activated carbon used in accordance with the invention can be obtained, for example, by carbonization and subsequent activation of sulfonated styrene/divinylbenzene copolymers in gel form, especially sulfonated divinylbenzene-crosslinked polystyrenes, in grain form, preferably in bead form.

In addition, for further details of the MOF materials usable in accordance with the invention, reference may be made particularly to international patent application WO 2009/096184 A1 and the parallel German patent application DE 10 2008 005 218 A1, the respective disclosures of which are hereby fully incorporated by reference.

The adsorption materials used in accordance with the invention, especially activated carbons, as well as their excellent physical properties (i.e. high mechanical stability, low abrasion and low dust formation and, as a result, excellent transport properties both within the bed and in the context of the regeneration process), additionally also have excellent adsorption properties with regard to the contaminants to be removed from the water to be treated or purified. More particularly, in the context of present invention, it is possible to use an activated carbon which has been tailored to some degree, which takes account of the complexity, the molecule sizes, and the specific polarities of the contaminants or micropollutants to be removed and the way that it influences the adsorption characteristics. More particularly, especially taking account of the polarities and the hydrate shells of the molecule size that result in the water phase, great significance attaches to the contaminants to be removed, in that a very specific adsorption pore system with a matched specific surface chemistry of the adsorption material or of the activated carbon used is advantageous for optimum adsorption. As stated above, it is possible to individually match or tailor the adsorption materials or activated carbons used in the context of the present invention to some degree in this regard, which leads to further optimization of the adsorption properties. As a result, significant advantages also result over conventional adsorption materials, especially with regard to adsorption performance, selectivity and the associated use times, which also leads to reduced costs overall.

More particularly, the adsorption material used in the context of the method of the invention, especially the preferably particulate activated carbon, may have a monodisperse particle size distribution or a heterodisperse particle size distribution.

In the context of the present invention, it is additionally preferable that the adsorption material, especially the preferably particulate activated carbon, has particle sizes, especially particle diameters, in the range from 0.001 to 5 mm, especially 0.005 to 3 mm, preferably 0.01 to 2 mm, more preferably 0.015 to 1.5 mm, most preferably 0.05 to 1 mm.

More particularly, the adsorption material, especially the preferably particulate activated carbon, has mean particle sizes, especially median particle diameters (D$50$), in the range from 0.01 to 2 mm, especially 0.05 to 1.5 mm, preferably 0.1 to 1 mm.

The corresponding particle sizes or diameters can especially be determined on the basis of the method according to ASTM D2862-97/04.

The selection of specific particle sizes or particle diameters leads, in the light of the present invention, firstly to a particularly homogeneous bed within the countercurrent filter apparatus and to improved transport properties of the activated carbon material, especially in the context of recycling or regeneration, but also in the context of the (transport) characteristics of the adsorption material in the bed, especially in the loose bed. Secondly, the particle sizes specified lead to a further improvement in the flow characteristics of the water in the bed.

In addition, the adsorption material, especially the preferably spherical activated carbon, should have an abrasion resistance (ball pan hardness) or abrasion hardness of at least 90%, especially at least 95%, preferably at least 97%, more preferably at least 98%, most preferably at least 99%. The abrasion resistance is especially determined to ASTM D3802-05. The high abrasion resistance leads to low abrasion of the activated carbon, especially in the context of the underlying transport processes, which likewise prolongs the duration of use.

In this connection, the adsorption material, especially the preferably particulate activated carbon, should have a compressive strength or bursting resistance (weight durability) per adsorption particle, especially per activated carbon particle, of at least 5 newtons, especially at least 10 newtons, preferably at least 20 newtons. More particularly, the adsorption material, especially the preferably particulate activated carbon, should have a compressive strength or bursting resistance (weight durability) per adsorption particle, especially per activated carbon particle, in the range from 10 to 50 newtons, especially 12 to 45 newtons, preferably 15 to 40 newtons.

In the context of present invention, it is likewise advantageous when the adsorption material, especially the preferably particulate activated carbon, is at least essentially dust-free. This prevents, for example, any sludge formation in the countercurrent filter apparatus.

Equally, the adsorption material, especially the preferably particulate activated carbon, should have an ash content of not more than 1% by weight, especially not more than 0.8% by weight, preferably not more than 0.6% by weight, more preferably not more than 0.5% by weight, especially preferably not more than 0.2% by weight. The ash content is especially determined to ASTM D2866/94-04.

The adsorption material, especially the preferably particulate activated carbon, should have a surface oxygen content of not more than 10% by weight, especially not more than 8% by weight, preferably not more than 6% by weight, more preferably not more than 5% by weight. In addition, the adsorption material, especially the preferably particulate activated carbon, should be hydrophobic and/or have hydrophobic surface properties. The surface oxygen content can especially be determined by means of the ESCA method (electron spectroscopy for chemical analysis).

More particularly, the adsorption material, especially the preferably particulate activated carbon, should have a specific surface area (BET surface area) of at least 500 m$^2$/g, especially at least 750 m$^2$/g, preferably at least 1000 m$^2$/g, especially preferably at least 1200 m$^2$/g. More particularly, the adsorption material, especially the preferably particulate activated carbon, should have a specific surface area (BET surface area) in the range from 500 to 4000 m$^2$/g, especially 750 to 3000 m$^2$/g, preferably 1000 to 2500 m$^2$/g, especially preferably 1100 to 2000 m$^2$/g.

The determination of the specific BET surface area is known in principle to those skilled in the art. All BET surface area figures given relate especially to the determination to ASTM D6556-04. In the context of the present invention, the BET surface area is especially determined by what is called the multipoint BET determination method (MP-BET) within a partial pressure range $p/p_0$ from 0.05 to 0.1.

In addition, the adsorption material, especially the preferably particulate activated carbon, should have an adsorption volume $V_{ads}$ of at least 250 cm$^3$/g, especially at least 300 cm$^3$/g, preferably at least 350 cm$^3$/g, especially preferably at least 400 cm$^3$/g. More particularly, the adsorption material, especially the preferably particulate activated carbon, should have an adsorption volume $V_{ads}$ in the range from 250 to 3000 cm$^3$/g, especially 300 to 2000 cm$^3$/g, preferably 350 to 2500 cm$^3$/g.

The adsorption volume $V_{ads}$ is a parameter well known to those skilled in the art for characterization of the particulate adsorption materials used. The determination methods for this purpose are also well known per se to those skilled in the art. More particularly, the adsorption volume $V_{ads}$ is the volume of $N_2$ adsorbed based on weight, which is generally determined at a partial pressure $p/p_0$ of 0.995.

In addition, the adsorption material, especially the preferably particulate activated carbon, should have a total pore volume according to Gurvich of at least 0.50 cm$^3$/g, preferably at least 0.55 cm$^3$/g, more preferably 0.60 cm$^3$/g, especially preferably at least 0.65 cm$^3$/g, most preferably 0.70 cm$^3$/g. In this connection, the adsorption material, especially the preferably particulate activated carbon, should have a total pore volume according to Gurvich in the range from 0.50 to 2.0 cm$^3$/g, especially 0.55 to 1.5 cm$^3$/g, preferably 0.60 to 1.2 cm$^3$/g, especially preferably 0.65 to 1.0 cm$^3$/g.

With regard to the determination of total pore volume according to Gurvich, this is a measurement or determination method known per se to those skilled in the art in this field. For further details regarding the determination of the total pore volume according to Gurvich, reference may be made, for example, to L. Gurvich (1915), J. Phys. Chem. Soc. Russ. 47, 805, and to S. Lowell et al., Characterization of Porous Solids and Powders: Surface Area Pore Size and Density, Kluwer Academic Publishers, Article Technologies Series, pages 111 ff.

In addition, the adsorption material, especially the preferably particulate activated carbon, may have a total porosity in the range from 10% to 80%, especially 20% to 75%, preferably 25% to 70%, based on the total volume of the adsorption material. In addition, the adsorption material, especially the preferably particulate activated carbon, may have a specific total pore volume in the range from 0.01 to 4.0 cm$^3$/g, especially 0.1 to 3.0 cm$^3$/g, preferably 0.2 to 2.0 cm$^3$/g. In particular, the proportion of pores having pore diameters of ≤75 Å may be at least 65%, especially at least 70%, preferably at least 75%. In addition, the adsorption material, especially the preferably particulate activated carbon, based on the total pore volume, especially on the total pore volume according to Gurvich, may have a proportion of micropores, especially of micropores having pore diameters of ≤30 Å, especially of ≤25 Å, preferably of ≤20 Å, of at least 70%, especially at least 75%, preferably at least 80%, more preferably at least 85%, especially preferably at least 90%.

The micropore volume can especially be determined by the carbon black method. The carbon black determination method is known per se to those skilled in the art, and so there is no need for any further details in this regard. In addition, for further details of the determination of the pore surface area and the pore volume by the carbon black method, reference may be made to R. W. Magee, Evaluation of the External Surface Area of Carbon Black by Nitrogen Adsorption, Presented at the Meeting of the Rubber Division of the American Chem. Soc., October 1994, referenced, for example, in: Quantachrome Instruments, AUTO-SORB-1, AS1 WinVersion 1.50, Operating Manual, OM, 05061, Quantachrome Instruments 2004, Florida, USA, pages 71 ff.

In addition, the adsorption material, especially the preferably particulate activated carbon, should have an iodine number of at least 1000 mg/g, especially at least 1250 mg/g, preferably at least 1500 mg/g. More particularly, the adsorption material, especially the preferably particulate activated carbon, should have an iodine number in the range from 1000 to 2100 mg/g, especially 1250 to 2050 mg/g, preferably 1500 to 2000 mg/g. The iodine number is especially determined to ASTM D4607-94/99.

Finally, the adsorption material, especially the preferably particulate activated carbon, should have a bulk density in the range from 250 to 700 g/L, especially 300 to 625 g/L, preferably 300 to 600 g/L, more preferably 350 to 550 g/L, the bulk density being determined especially to ASTM B527-93/00. The bulk densities envisaged in accordance with the invention likewise lead to optimized behavior of the adsorption material, especially in the loose bed, accompanied by optimized flow characteristics of the water to be treated or purified in the bed.

As stated above, the adsorption material laden with the contaminants which is used in accordance with the invention can be subjected to a regeneration, especially a thermal regeneration, to obtain an unladen or regenerated or fresh adsorption material which can be fed back to the countercurrent filter apparatus on completion of regeneration.

Against this background, reference is made hereinafter to particular embodiments and details relating to the regeneration of the adsorption material.

In this connection, it is particularly advantageous in the context of the present invention when the adsorption material conducted out of and/or removed from the countercurrent filter apparatus, especially the adsorption material laden with the contaminants, is dried and/or subjected to a regeneration and/or recycling operation, especially a continuous and/or especially a thermal regeneration and/or recycling operation, and optionally subsequently remoistened. For this purpose, it is especially possible to use a regeneration apparatus which may be part of the purification plant of the invention as defined hereinafter and which especially comprises:

optionally at least one drying and/or demoistening unit for drying and/or demoistening the adsorption material conducted out of and/or removed from the countercurrent filter apparatus and/or the adsorption material laden with the contaminants, especially wherein the drying and/or demoistening unit is disposed downstream of the countercurrent filter apparatus, based on the transport direction of the adsorption material, at least one regeneration and/or desorption unit or apparatus, especially for preferably thermal regeneration of the adsorption material conducted out of and/or removed from the countercurrent filter apparatus and/or of the adsorption material laden with contaminants and/or for provision of regenerated and/or unused adsorption material, especially wherein the regeneration and/or desorption unit is disposed downstream of the countercurrent filter apparatus and/or downstream of the drying and/or demoistening apparatus and/or especially wherein the regeneration and/or desorption unit is disposed upstream of the countercurrent filter apparatus, based in each case on the transport direction of the adsorption material, optionally at least one moistening unit or apparatus, especially for moistening of regenerated and/or unused adsorption material, especially wherein the moistening unit is disposed downstream of the regeneration and/or desorption unit and/or especially wherein the moistening unit is disposed upstream of the countercurrent filter apparatus, based in each case on the transport direction of the adsorption material.

More particularly, in the context of the present invention, it may be the case that the adsorption material conducted out of and/or removed from the countercurrent filter apparatus and/or the adsorption material laden with the contaminants is dried, especially using the drying and/or demoistening unit. In this connection, the residual moisture content of the dried adsorption material may be adjusted to a value of not more than 1% by weight, especially not more than 0.5% by weight, preferably not more than 0.2% by weight, based on the adsorption material. The residual water obtained in the context of the demoistening may, for example, be fed back to the countercurrent filter apparatus as untreated water.

This drying operation may be divided into predrying and/or main drying steps, especially successive predrying and/or main drying steps. More particularly, in the context of the drying, especially predrying, it is possible, for example, to use inclined clarifiers and/or belt driers. In addition, in the context of the drying, especially main drying, it is possible to use belt driers and/or fluidized bed driers. More particularly, the feeding and/or transport of the adsorption material (i.e. adsorption material suspended in residual water), especially in the form of a suspension, can be fed to the aforementioned drying and/or demoistening units via pipelines using corresponding pump apparatuses and/or suspension conveying apparatuses, especially jet pumps and/or peristaltic pumps.

In addition, the adsorption material conducted out of and/or removed from the countercurrent filter apparatus, especially on completion of drying, preferably as defined above, is subjected to a regeneration and/or desorption, especially a thermal regeneration and/or desorption, especially with release and/or desorption of the contaminants adsorbed in the adsorption material, especially using the regeneration and/or desorption unit. In this connection, the procedure is especially such that the contaminants present in the adsorption material are desorbed and/or the regenerated or unladen or fresh adsorption material is obtained.

More particularly, the optionally dried adsorption material, using suitable conveying apparatuses, such as a vibrating channel, a conveying apparatus, especially a pneumatic conveying apparatus, and/or a belt apparatus can be fed to the regeneration and/or desorption unit. The regeneration and/or desorption unit, in accordance with the invention, is especially a preferably indirectly heated rotary oven, a high-temperature fluidized bed apparatus and/or a microwave oven. As a result of the desorption, which is especially a thermal desorption, on the basis of which the contaminants are removed from or driven out of the adsorption material with the aid of thermal energy, a desorbed or regenerated or unused or fresh adsorption material is obtained.

In the context of the regeneration of the adsorption material, in accordance with the invention, the procedure may especially be such that the adsorption material is heated, especially in the regeneration and/or desorption unit, to temperatures in the range from 150° C. to 1000° C., especially 200° C. to 950° C., preferably 250° C. to 900° C., more preferably 250° C. to 500° C., especially for a period of 1 min to 300 min, especially 10 min to 200 min. In this connection, the heating may be conducted under an inert gas atmosphere or under an at most slightly oxidizing atmosphere.

With regard to the contaminants removed from the adsorption material, the contaminants released and/or desorbed in this way may be sent to a thermal final utilization, especially incineration, in which case it is possible to use the incineration apparatuses known per se to those skilled in the art for this purpose.

In the context of the regeneration, especially the thermal regeneration, it may likewise be the case in accordance with the invention that the regenerated or fresh adsorption material is cooled or introduced into and/or stored intermediately in a reservoir unit or apparatus. In this connection, the transport of the adsorption material freed of the contaminants, proceeding from the regeneration or desorption unit into the reservoir apparatus, can be effected using the apparatuses cited above for the transport of the adsorption material from the drying apparatus to the regeneration or desorption unit. The storage of regenerated or unladen or fresh adsorption material, especially in the reservoir apparatus cited above, is associated with the advantage that the volume of regenerated or unladen or fresh adsorption material conducted into the countercurrent filter apparatus again can be adjusted or dosed as required.

In addition, in the context of present invention, the procedure may be such that the regenerated or unladen or fresh adsorption material is moistened using the moistening unit in particular and/or introduced into water. In this regard, it is possible to use corresponding conveying or moistening units, for example jet pumps and/or peristaltic pumps. In this way, it is especially possible to obtain a preferably aqueous suspension of the regenerated or unused or fresh adsorption material. For the moistening of the adsorption material, it is especially possible to use corresponding untreated water. The conveying or moistening units may likewise or simultaneously be used for transport of the adsorption material to or into the countercurrent filter apparatus, especially if the latter comprises jet pumps or peristaltic pumps.

The regenerated or unladen or fresh and preferably moistened adsorption material obtained in this way can subsequently be conducted or introduced back into the countercurrent filter apparatus, especially under pressure, preferably via corresponding pipelines connected to the adsorption material inlet of the countercurrent apparatus.

If corresponding pump units, for example based on jet pumps and/or peristaltic pumps, are used for transport of the adsorption material, especially in the form of a preferably aqueous dispersion, the motive water in this regard may likewise be taken from the untreated water. The pump apparatuses used may likewise be used for moistening of the adsorption material.

With regard to the method of the invention, moreover, the method according to the invention may be conducted with a circulation factor, calculated as the quotient of the amount of the adsorption material [kg] present in the regeneration and/or recycling, especially in the regeneration apparatus, and the amount of the adsorption material [kg] present in the countercurrent filter apparatus in the range from 0.1 to 100, especially 0.5 to 75, preferably 0.75 to 50, more preferably 1 to 40, especially preferably 1.25 to 30. In the context of the present invention, the procedure may thus be such that a relatively high proportion of adsorption material is present in the countercurrent filter apparatus, especially in the form of the preferably loose bed, and is used as such for the purposes of purifying the untreated water, which constitutes a method-specific optimization. The circulation factor can especially be calculated by the general formula $F_U = m_{ads,DP}/m_{ads,AP}$ (with $F_U$: circulation factor; $m_{ads,DP}$: mass or amount of the adsorption material in the regeneration and/or desorption process; $m_{ads,AP}$: mass or amount of the adsorption material in the countercurrent filter apparatus).

The present invention likewise relates, in this aspect of the present invention, to a method for treatment and/or purification of water, especially of wastewater or drinking water, preferably for adsorptive removal of inorganic- or organic-based, especially organic-based, contaminants such as trace substances and/or micropollutants. The method is especially conducted as defined above, wherein water to be treated and/or purified, for the purposes of treatment and/or purification, is contacted with an adsorption material, especially a particulate adsorption material, wherein the adsorption material is disposed in a bed, especially in a loose bed, in a countercurrent filter apparatus, especially a countercurrent adsorption filter column, and the water to be treated and/or purified flows through it for adsorptive removal of the contaminants. In addition, the adsorption material of the bed disposed in the countercurrent filter apparatus is removed and regenerated, especially in a continuous manner, in countercurrent to the flow of the water to be treated and/or purified. In this context, moreover, regenerated and/or unused adsorption material, preferably regenerated adsorption material, is fed in countercurrent to the stream of the water to be treated and/or purified in amounts at least essentially equal to that of adsorption material removed from the bed.

More particularly, the method of the invention can also be conducted using the purification plant according to the invention as defined hereinafter, which may comprise a regeneration apparatus and the countercurrent filter apparatus according to the invention.

As stated above, the method of the invention is described in more detail by the further independent method claims and dependent claims in this regard, and by reference to the descriptions of the figures.

The present invention further relates—in a further aspect of the present invention—to the purification plant of the invention, preferably for treatment and/or purification of water, especially of wastewater or drinking water, preferably for adsorptive removal of inorganic- or organic-based, especially organic-based, contaminants such as trace substances and/or micropollutants, wherein the plant includes at least one countercurrent filter apparatus, especially countercurrent adsorption filter column, for treatment of water and for uptake, storage and release, especially continuous uptake, storage and release, of at least one preferably particulate adsorption material, and at least one regeneration apparatus for withdrawal, especially continuous withdrawal, of adsorption material laden with the contaminants from the countercurrent filter apparatus, regeneration and/or recycling of adsorption material laden with the contaminants and feeding of regenerated or unused adsorption material back into the countercurrent filter apparatus, wherein the regeneration apparatus, for regeneration and reuse, especially continuous regeneration and reuse, of the adsorption material is connected to the countercurrent filter apparatus in such a way that, in the operating state and/or use state of the purification plant, the water to be treated and/or purified and the adsorption material are conducted in countercurrent and/or in opposite directions to one another in the countercurrent filter plant.

The purification plant of the invention is especially suitable for use in the context of the above-described method according to the invention. More particularly, the purification plant of the invention enables the principle of the invention, whereby the adsorption material on the one hand and the water to be treated or purified on the other hand are conducted in countercurrent to one another for the purpose of purifying the water or removing contaminants such as trace substances or micropollutants from the water. In addition, the purification plant of the invention enables simultaneous purification of untreated water and regeneration of the adsorption material with the respective recycling of regenerated adsorption material for further purification or repurification of untreated water, so as to provide, overall, a high-performance purification plant according to the invention, which enables the implementation of all the method aspects of the present invention with a low space demand and inexpensive operation. More particularly, the purification plant of the invention enables optimized circulation factors since a high proportion of the adsorption material present in the plant overall can be used for the purposes of purifying untreated water. On the basis of the specific inventive technical design of the purification plant according to the invention, in addition, high specific mass throughputs are possible, since, based on the amount of sorption material used, large amounts or volumes of purified water or filtrate are obtained. Finally, the purification plant of the invention enables efficient purification of untreated water, with prevention of breakthroughs of the contaminants in question particularly because of the use of a specific countercurrent filter apparatus, especially as defined hereinafter, thus making it possible to obtain a high-purity filtrate, which is of high significance particularly also for provision of drinking water.

For further details in this regard relating to the purification plant of the invention, as stated above, reference may be made to the corresponding further independent claims and to the dependent claims that relate to the purification plant of the invention, and the corresponding descriptions of the figures.

Furthermore, the present invention—in a further aspect of the present invention—relates to the countercurrent filter apparatus of the invention, especially countercurrent adsorption filter column, preferably continuous countercurrent adsorption filter column, preferably for treatment and/or purification of water, especially of wastewater or drinking water, preferably for adsorptive removal of inorganic- or organic-based, especially organic-based, contaminants such as trace substances and/or micropollutants, and for uptake, storage and release, preferably continuous uptake, storage and release, of at least one preferably particulate adsorption material, wherein the countercurrent filter apparatus has at least one housing, said housing having at least one adsorption and/or countercurrent zone and at least one water entry region and at least one water exit region, wherein the adsorption and/or countercurrent zone, in terms of flow, is disposed between the water entry region and the water exit region and/or wherein the adsorption and/or countercurrent zone is disposed downstream of the water entry region and upstream of the water exit region, based on the flow direction of the water, and wherein the water entry region has at least one adsorption material outlet and wherein the water exit region has at least one adsorption material inlet.

Because of the specific apparatus configuration of the countercurrent filter apparatus according to the invention, it is firstly possible to implement the principle of the opposite transport of untreated water on the one hand and adsorption material on the other hand that underlies the present invention in the countercurrent filter apparatus. Secondly, the countercurrent filter apparatus of the invention enables, with simultaneously high purification of the untreated water, high superficial velocities or filtering rates, which leads to high throughputs of untreated water and the obtaining of large amounts of purified filtrate.

In addition, the filter apparatus of the invention is notable for a compact and hence space-saving construction, especially also with regard to the adsorption or countercurrent zone. As explained hereinafter, the adsorption or countercurrent zone may have a smaller diameter or a smaller cross-sectional area than the corresponding water entry and exit regions of the filter apparatus of the invention, which equally allows or leads to an increase in the superficial velocity or filtering rate; wherein, in a preferred embodiment of the invention and as cited hereinafter, specific transition regions are disposed between the adsorption and/or countercurrent zone and the water entry region or the water exit region, and this leads to optimization of the respective transport processes of water and adsorption material in terms of flow.

In this connection, the inventive principle of the opposite transport of untreated water and adsorption material is also conducive to high superficial velocities or filtering rates, since regenerated or unladen or fresh adsorption material is always being fed to the actual purification process to some degree in accordance with the invention, which enables high through-flow rates or flow velocities in relation to the untreated water with simultaneously efficient purification (avoidance of breakthroughs of trace materials or micropollutants).

For further details relating to the countercurrent filter apparatus of the invention, as stated above, reference may be made to the corresponding dependent apparatus claims and the corresponding descriptions of the figures.

Finally, the present invention relates—in a further aspect of the present invention—to the use of a purification plant, especially as defined in the present context, or of a countercurrent filter apparatus, especially as defined in the present context, or of adsorption material, especially as defined in the present context, in a method for treatment or purification of water, especially of wastewater or drinking water, preferably for adsorptive removal of inorganic- or organic-based, especially organic-based, contaminants, especially as defined in the present context.

The present invention is elucidated in detail hereinafter with reference to preferred working examples or drawings or figures that represent embodiments. In connection with the elucidation of these preferred working examples of the present invention, although these are not restrictive in any way in relation to the present invention, further advantages, properties, aspects and features of the present invention are also indicated.

Figure 2:
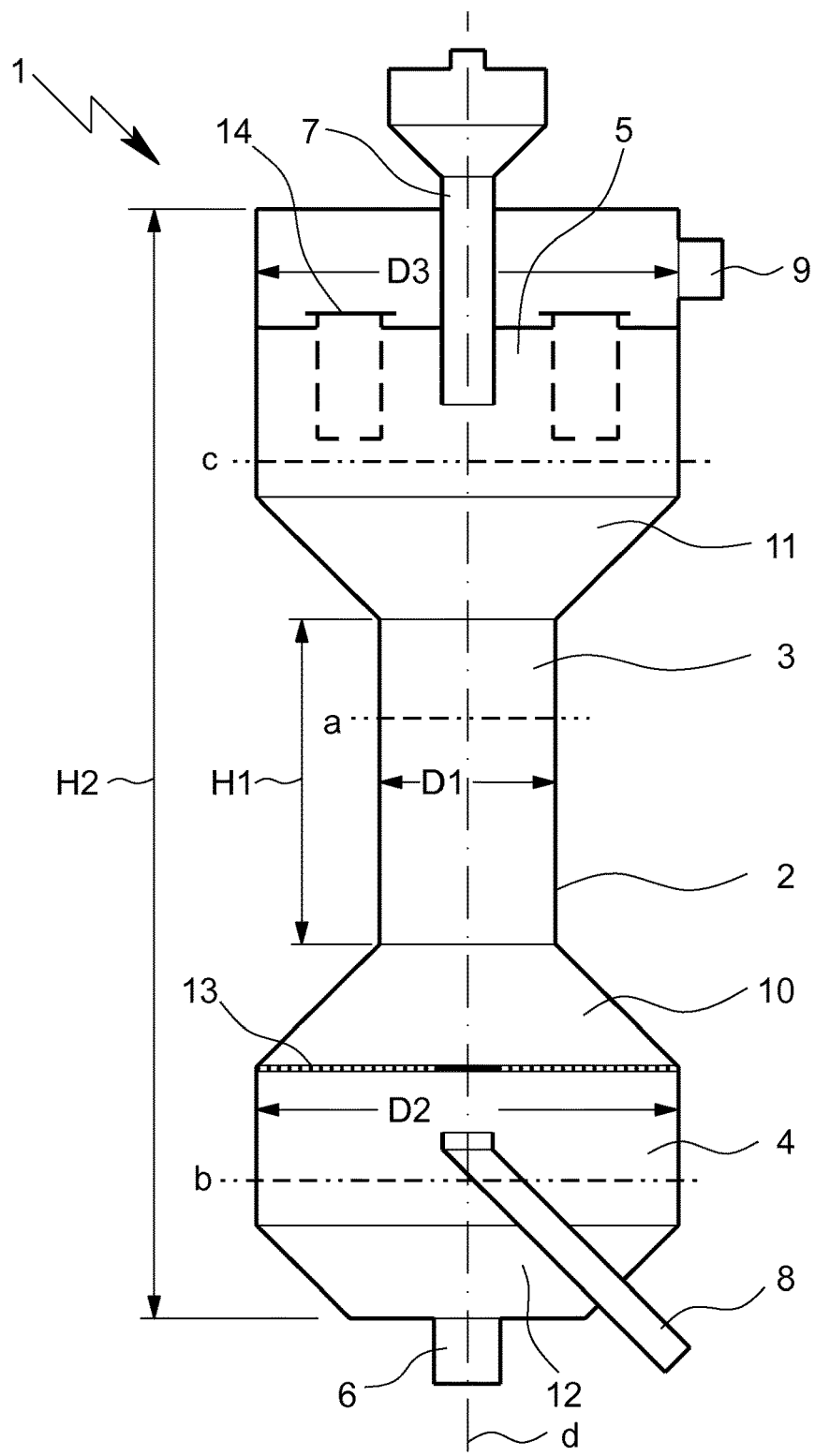
FIG. 2 provides a schematic section diagram of the countercurrent filter apparatus 1 of the invention, especially countercurrent adsorption filter column, in a preferred embodiment of the invention, wherein the countercurrent filter apparatus 1 has at least one housing 2, said housing 2 having at least one adsorption and/or countercurrent zone 3 and at least one water entry region 4 and at least one water exit region 5, and wherein the water entry region 4 has at least one adsorption material outlet 6 and wherein the water exit region 5 has at least one adsorption material inlet 7.
Figure 3:
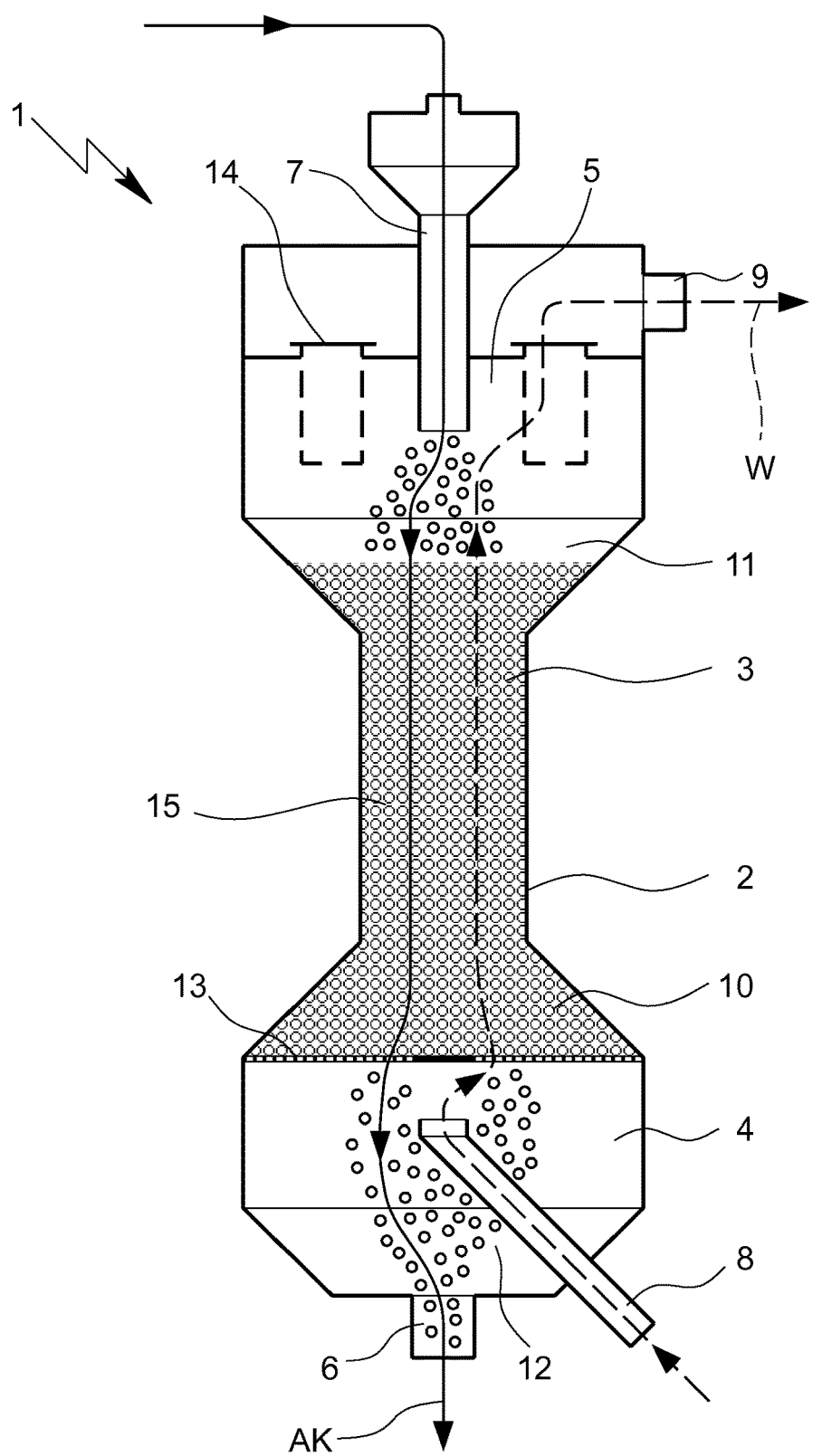
FIG. 3 provides a further schematic section diagram of the countercurrent filter apparatus 1 of the invention, especially countercurrent adsorption filter column, in a preferred embodiment of the invention and with an illustration of the flow or transport of the water W on the one hand and the adsorption material AK on the other hand that is present in the countercurrent filter apparatus 1, so of the bed 15, especially the loose bed 15, of the adsorption material present in the countercurrent filter apparatus

The figures show:

FIG. 1 a schematic diagram or overview of the purification plant A of the invention, preferably for treatment or purification of water or untreated water AW, preferably for adsorptive removal of inorganic- or organic-based, especially organic-based, contaminants such as trace materials and/or micropollutants, in one embodiment of the invention;

FIG. 2 a schematic section diagram of the countercurrent filter apparatus 1 of the invention, especially countercurrent adsorption filter column, in a preferred embodiment of the invention, wherein the countercurrent filter apparatus 1 has at least one housing 2, said housing 2 having at least one adsorption and/or countercurrent zone 3 and at least one water entry region 4 and at least one water exit region 5, and wherein the water entry region 4 has at least one adsorption material outlet 6 and wherein the water exit region 5 has at least one adsorption material inlet 7;

FIG. 3 a further schematic section diagram of the countercurrent filter apparatus 1 of the invention, especially countercurrent adsorption filter column, in a preferred embodiment of the invention and with an illustration of the flow or transport of the water W on the one hand and the adsorption material AK on the other hand that is present in the countercurrent filter apparatus 1, so of the bed 15, especially the loose bed 15, of the adsorption material present in the countercurrent filter apparatus.

FIG. 1 is a schematic diagram of a preferred embodiment of the purification plant of the invention, as defined in further detail hereinafter:

More particularly, FIG. 1 shows the purification plant A of the invention, preferably for treatment and/or purification of water AW, especially of wastewater or drinking water, preferably for adsorptive removal of inorganic- or organic-based, especially organic-based, contaminants such as trace substances and/or micropollutants, wherein the plant A includes

- at least one countercurrent filter apparatus 1, especially countercurrent adsorption filter column, for treatment and/or purification of water AW and for uptake, storage and release, especially continuous uptake, storage and release, of at least one preferably particulate adsorption material, and
- at least one regeneration apparatus RV for withdrawal, especially continuous withdrawal, of adsorption material laden with the contaminants from the countercurrent filter apparatus 1, regeneration and/or recycling of adsorption material laden with the contaminants and feeding of regenerated and/or unladen and/or fresh adsorption material back into the countercurrent filter apparatus 1, wherein the regeneration apparatus RV, for regeneration and reuse, especially continuous regeneration and reuse, of the adsorption material is connected to the countercurrent filter apparatus 1 in such a way that, in the operating state and/or use state of the plant A, the water AW to be treated and/or purified and the adsorption material are conducted in countercurrent and/or in opposite directions to one another in the countercurrent filter apparatus 1.

The present invention likewise relates to a purification plant A as shown in FIG. 1, preferably for treatment and/or purification of water AW, especially of wastewater or drinking water, preferably for adsorptive removal of inorganic- or organic-based, especially organic-based, contaminants such as trace substances and/or micropollutants, wherein the plant (A) includes:

- at least one countercurrent filter apparatus, especially countercurrent adsorption filter column, for treatment of water AW and for uptake, storage and release, especially continuous uptake, storage and release, of at least one preferably particulate adsorption material, especially as defined above, especially wherein, in the operating state and/or use state, the water AW to be treated and/or purified and the adsorption material are conducted in countercurrent and/or in opposite directions to one another in the countercurrent filter apparatus 1, and
- optionally at least one drying and/or demoistening unit T1, T2, T3 for drying and/or demoistening of adsorption material laden with the contaminants, especially wherein the drying and/or demoistening unit T1, T2, T3 is disposed downstream of the countercurrent filter apparatus 1, based on the transport direction of the adsorption material,
- at least one regeneration and/or desorption unit R, especially for regeneration of adsorption material laden with the contaminants and/or for provision of regenerated and/or unladen and/or fresh adsorption material, especially wherein the regeneration and/or desorption unit R is disposed downstream of the countercurrent filter apparatus 1 and/or downstream of the drying and/or demoistening unit T1, T2, T3 and/or especially wherein the regeneration and/or desorption unit R is disposed upstream of the countercurrent filter apparatus 1, based in each case on the transport direction of the adsorption material,
- optionally at least one moistening unit B, especially for moistening of regenerated and/or unladen and/or fresh adsorption material, especially wherein the moistening unit B is disposed downstream of the regeneration and/or desorption unit R and/or especially wherein the moistening unit B is disposed upstream of the countercurrent filter apparatus, based in each case on the transport direction of the adsorption material.

More particularly, the present invention also relates to a purification plant A as shown in FIG. 1, preferably for treatment and/or purification of water AW, especially of wastewater or drinking water, preferably for adsorptive removal of inorganic- or organic-based, especially organic-based, contaminants such as trace substances and/or micropollutants, wherein the plant A includes:

- at least one countercurrent filter apparatus 1, especially countercurrent adsorption filter column, for treatment and/or purification of water AW and for uptake, storage and release, especially continuous uptake, storage and release, of at least one preferably particulate adsorption material, especially as defined above, especially wherein, in the operating state and/or use state, the water AW to be treated and/or purified and the adsorption material are conducted in countercurrent and/or in opposite directions to one another in the countercurrent filter apparatus,
- wherein the countercurrent filter apparatus 1 has at least one housing 2, said housing 2 having at least one adsorption and/or countercurrent zone 3 and at least one water entry region 4 and at least one water exit region 5,
- wherein the adsorption and/or countercurrent zone 3, in terms of flow, is disposed between the water entry region 4 and the water exit region 5 and/or wherein the adsorption and/or countercurrent zone 3 is disposed downstream of the water entry region 4 and upstream of the water exit region 5, based on the flow direction of the water, and
- wherein the water entry region 4 has at least one adsorption material outlet 6 and wherein the water exit region 5 has at least one adsorption material inlet 7,
- optionally at least one drying and/or demoistening unit T1, T2, T3 for drying and/or demoistening of adsorption material laden with the contaminants, especially wherein the drying and/or demoistening unit T1, T2, T3 is disposed downstream of the countercurrent filter apparatus 1, based on the transport direction of the adsorption material,
- at least one regeneration and/or desorption unit R, especially for regeneration of adsorption material laden with the contaminants and/or for provision of regenerated and/or unladen and/or fresh adsorption material, especially wherein the regeneration and/or desorption unit R is disposed downstream of the countercurrent filter apparatus 1 and/or downstream of the drying and/or demoistening unit T1, T2, T3, based in each case on the transport direction of the adsorption material,
- optionally at least one moistening unit B, especially for moistening of regenerated and/or unused adsorption material, wherein the moistening unit B is disposed downstream of the regeneration and/or desorption unit R, based on the transport direction of the adsorption material.

With regard to the drying and/or demoistening plant T1, T2, T3 of the purification plant of the invention, as defined above, the latter may be selected from the group of belt driers, fluidized bed driers and inclined clarifiers and combinations thereof. More particularly, the drying and/or demoistening unit T1, T2, T3 may comprise at least one main drying and/or main demoistening unit T2, T3, especially selected from belt driers and/or fluidized bed driers, and optionally at least one predrying and/or predemoistening unit T1, T2, especially selected from inclined clarifiers and belt driers. In this connection, the predrying and/or predemoistening unit T1, T2 should be disposed upstream of the main drying and/or main demoistening unit T2, T3, based on the transport direction of the adsorption material.

According to the invention, it may additionally be the case that the respective drying and/or demoistening units T1, T2, T3 are each independently equipped with recycle units for transporting withdrawn residual water away, especially for feeding and/or recycling the residual water back into the water flow and/or stream W, preferably for recycling into the water entry region 8 of the countercurrent filter apparatus 1.

More particularly, the drying and/or demoistening unit T1, T2, T3 may be connected to the adsorption material outlet 6 of the countercurrent filter apparatus 1, especially by means of a pipeline through which the adsorption material, especially provided with residual water and present in a suspension, is transported.

In addition, the regeneration and/or desorption unit R may be selected from the group of rotary ovens, especially indirectly heated rotary ovens; belt ovens, especially indirectly heated belt ovens; fluidized bed driers, especially high-temperature fluidized bed driers; and microwave ovens.

With regard to the regeneration and/or desorption unit R, moreover, the latter may additionally include means and/or units for transporting away and/or for further treatment, especially for thermal decomposition, of desorbed contaminants and/or contaminants released from the adsorption material.

In the context of the present invention, it may be the case that the drying and/or demoistening unit T1, T2, T3, especially the main drying and/or main demoistening unit T2, T3, preferably the main drying and/or main demoistening unit T3, is connected to the regeneration and/or desorption unit R, especially by means of a pipeline, an agitated transport unit, a conveying unit, especially a pneumatic conveying unit, and/or a belt transport unit. In this way, the dried adsorption material can be conducted to the regeneration or adsorption unit.

More particularly, the adsorption material outlet 6 of the countercurrent filter apparatus may be connected to the regeneration and/or desorption unit R, especially by means of a pipeline, especially in the case, which is less preferred in accordance with the invention, of the procedure without a drying and/or demoistening unit T1, T2, T3.

More particularly, the moistening unit (B) may be selected from the group of stirred tanks, spray towers, belt moisteners, (water-)jet pumps, peristaltic pumps and combinations thereof.

In addition, the purification plant A according to the invention may also include at least one reservoir unit V, especially for storage and/or intermediate storage of regenerated and/or unladen and/or fresh adsorption material. In this connection, the reservoir unit V may be disposed downstream of the regeneration and/or desorption unit R and/or upstream of the moistening unit B, based on the transport direction of the adsorption material.

With regard to the regeneration and/or desorption unit R, moreover, the latter may be connected to the reservoir unit V and/or the moistening unit B, especially by means of a pipeline, an agitated transport unit, a conveying unit, especially a pneumatic conveying unit, and/or a belt transport unit. More particularly, the reservoir unit V and/or the moistening unit B may be connected to the adsorption material inlet of the countercurrent filter apparatus 1, especially by means of a pipeline.

According to the invention, more particularly, the purification plant A, in the operating state and/or use state, has and/or enables a water flow and/or stream (W), especially with a flow and/or stream of water AW to be treated and/or purified that enters the countercurrent filter apparatus 1 and especially with a flow and/or stream of purified water and/or filtrate Fl that exits from the countercurrent filter apparatus. More particularly, the purification plant A, in the operating state and/or use state, should have and/or enable adsorbent transport or adsorbent flow AK, especially cyclic adsorption transport or adsorption flow. In this connection, in accordance with the invention, more particularly, the water flow and/or stream W and the adsorbent transport or adsorbent flow AK in the countercurrent filter apparatus 1 run in countercurrent to one another and/or in opposite directions to one another.

More particularly, the purification plant of the invention may include the countercurrent filter apparatus of the invention, as defined hereinafter.

In addition, FIG. 2 is a schematic diagram of a preferred embodiment of the countercurrent filter apparatus 1 according to the invention.

More particularly, FIG. 2 shows the countercurrent filter apparatus 1 of the invention, especially countercurrent adsorption filter column, preferably for treatment and/or purification of water, especially of wastewater or drinking water, preferably for adsorptive removal of inorganic- or organic-based, especially organic-based, contaminants such as trace substances and/or micropollutants, and for uptake, storage and release, especially continuous uptake, storage and release, of at least one preferably particulate adsorption material, wherein the countercurrent filter apparatus 1 has at least one housing 2, said housing 2 having at least one adsorption and/or countercurrent zone 3 and at least one water entry region 4 and at least one water exit region 5, wherein the adsorption and/or countercurrent zone 3, in terms of flow, is disposed between the water entry region 4 and the water exit region 5 and/or wherein the adsorption and/or countercurrent zone 3 is disposed downstream of the water entry region 4 and upstream of the water exit region 5, based on the flow direction of the water, and wherein the water entry region 4 has at least one adsorption material outlet 6 and wherein the water exit region 5 has at least one adsorption material inlet 7.

More particularly, the water entry region 4 should have at least one water feed 8 and the water exit region 5 at least one water drain 9.

Likewise, in the operating state and/or use state, in the adsorption and/or countercurrent zone, the water to be treated and/or purified and the adsorption material are conducted in countercurrent and/or in opposite directions to one another and/or are contacted with one another.

The countercurrent filter apparatus of the invention is, as shown in FIG. 1, especially designed in such a way that the adsorption and/or countercurrent zone 3 is at least essentially tubular and/or takes the form of a tube.

In a preferred embodiment of the invention, the ratio of the height H1 to the diameter D1 of the adsorption and/or countercurrent zone 3 [ratio of height H1:diameter D1] should be at least 1.5:1, especially at least 2:1, preferably at least 2.5:1, more preferably at least 3:1. In this connection, the ratio of the height H1 to the diameter D1 of the adsorption and/or countercurrent zone 3 [ratio of height H1:diameter D1] should be in the range from 1.5:1 to 20:1, especially 2:1 to 15:1, preferably 2.5:1 to 10:1, more preferably 3:1 to 8:1.

More particularly, the countercurrent filter apparatus 1 of the adsorption and/or countercurrent zone 1 should have a height H1 of at least 0.5 m, especially at least 0.75 m, preferably at least 1 m, more preferably at least 2 m, especially preferably at least 3 m. Likewise, the adsorption and/or countercurrent zone 3 should have a height H1 in the range from 0.5 m to 10 m, especially in the range from 0.75 m to 8 m, preferably 1 m to 7 m, more preferably 2 m to 7 m, especially preferably 3 m to 5 m.

More particularly, the adsorption and/or countercurrent zone 3 of the countercurrent filter apparatus 1 should have a diameter D1 of at most 2.5 m, especially at most 2 m, preferably at most 1.5 m, more preferably at most 1.25 m, especially preferably at most 1 m. Likewise, the adsorption and/or countercurrent zone should have a diameter D1 in the range from 0.05 to 2.5 m, especially in the range from 0.1 to 2 m, preferably 0.25 to 1.5 m, more preferably 0.5 to 1.25 m, especially preferably 0.5 m to 1 m.

In a preferred embodiment of the invention, the ratio of the total height H2 of the countercurrent filter unit 1 to the height H1 of the adsorption and/or countercurrent zone 3 [ratio of total height H2:height H1] is at least 1.25:1, especially at least 1.5:1, preferably at least 1.75:1, more preferably at least 2:1. In this connection, the ratio of the total height H2 of the countercurrent filter unit 1 to the height H1 of the adsorption and/or countercurrent zone 3 [ratio of total height H2:height H1] should be at most 5:1, especially at most 4.75:1, preferably at most 4.5:1, more preferably at most 4:1. In addition, the ratio of the total height H2 of the countercurrent filter unit 1 to the height H1 of the adsorption and/or countercurrent zone 3 [ratio of total height H2:height H1] should be in the range from 1.25:1 to 5:1, especially 1.5:1 to 4.75:1, preferably 1.75:1 to 4.5:1, preferably 2:1 to 4:1.

In addition, the ratio of the diameter D1 of the adsorption and/or countercurrent zone 3 to the diameter D2 of the water entry region 4 [ratio of diameter D1:diameter D2] should be at least 1:1.1, especially at least 1:1.25, preferably at least 1:1.5, more preferably at least 1:1.75, especially preferably at least 1:2. In this connection, the ratio of the diameter D1 of the adsorption and/or countercurrent zone 3 to the diameter D2 of the water entry region 4 [ratio of diameter D1:diameter D2] should be in the range from 1:1.1 to 1:5, especially 1:1.25 to 1:3, preferably 1:1.5 to 1:2.5, more preferably 1:1.5 to 1:2.

More particularly, the ratio of the diameter D1 of the adsorption and/or countercurrent zone 3 to the diameter D3 of the water exit region 5 [ratio of diameter D1:diameter D3] is at least 1:1.1, especially at least 1:1.25, preferably at least 1:1.5, more preferably at least 1:1.75, especially preferably at least 1:2. In this connection, the ratio of the diameter D1 of the adsorption and/or countercurrent zone 3 to the diameter D3 of the water exit region 5 [ratio of diameter D1:diameter D3] is in the range from 1:1.1 to 1:5, especially 1:1.25 to 1:3, preferably 1:1.5 to 1:2.5, more preferably 1:1.5 to 1:2.

According to the invention, is also advantageous in terms of flow when the adsorption and/or countercurrent zone 3 has an at least essentially circular and/or round cross section a.

In this connection, the water entry region 4 should also have an at least essentially circular and/or round cross section b.

In the context of the present invention, it may likewise be the case that the water exit region 5 has an at least essentially circular and/or round cross section c.

According to the invention, it is additionally preferable that the cross-sectional area a of the adsorption and/or countercurrent zone 3 is less than the cross-sectional area b of the water entry region 4 and/or less than the cross-sectional area c of the water exit region 5.

More particularly, in accordance with the invention, it may likewise be the case that the cross-sectional area b of the water entry region 4 and the cross-sectional area c of the water exit region 5 are at least essentially of equal size.

In relation to the adsorption or countercurrent zone 3, in a preferred embodiment of the invention, there is thus some degree of narrowing or a lower diameter or a lower cross-sectional area compared to the water entry region 4 or the water exit region 5, which leads especially to optimization of the flows or mass transfers or mass flows of water and adsorption material that are present in the adsorption or countercurrent zone 3, especially with regard to the avoidance or reduction of vortices or the like or else with regard to the avoidance of what are called dead zones of reduced or zero flow, accompanied by the formation of a stable bed of the adsorption material and optimization of the contacting of water on the one hand and adsorption material on the other hand. In addition, it is also possible in this way to implement high superficial velocities or filtering rates.

With regard to the countercurrent filter apparatus 1 of the invention, moreover, it may be the case that the adsorption and/or countercurrent zone 3, the water entry region 4 and/or the water exit region 5 are arranged such that the at least essentially circular and/or round cross section a of the adsorption and/or countercurrent zone 3, the at least essentially circular and/or round cross section b of the water entry region 4 and/or the at least essentially circular and/or round cross section c of the water exit region 5 are arranged at least essentially concentrically along the longitudinal axis d of the countercurrent filter apparatus 1.

More particularly, the countercurrent filter apparatus 1 has a first transition region 10. In this connection, the first transition region 10, in terms of flow, should be disposed between the water entry region 4 and the adsorption and/or countercurrent zone 3. Furthermore, the first transition region 10 should be disposed downstream of the water entry region 4 and upstream of the adsorption and/or countercurrent zone 3, based on the flow direction of the water.

Furthermore, the first transition region 10 should be frustoconical and/or conical. In addition, the first transition region 10, proceeding from the water entry region 4 having the diameter D2, should narrow in the direction of the adsorption and/or countercurrent zone 3 having the diameter D1, which likewise affords advantages in terms of flow, since a funnelling function is provided to some degree for focusing the flow of water.

In addition, the countercurrent filter apparatus 1 should have a second transition region 11. In this connection, the second transition region 11, in terms of flow, should be disposed between the water exit region 5 and the adsorption and/or countercurrent zone 3. More particularly, the second transition region 11 should be disposed downstream of the adsorption and/or countercurrent zone 3 and upstream of the water exit region 5, based on the flow direction of the water.

With regard to the second transition region 11, moreover, the latter should be frustoconical and/or conical. In addition, the second transition region 10, proceeding from the water exit region 5 having the diameter D3, should narrow in the direction of the adsorption and/or countercurrent zone 3 having the diameter D1. The second transition region 11 especially leads to an optimized feed of the adsorption material into the adsorption or countercurrent zone and the obtaining of a homogeneous or optimally structured bed of the adsorption material.

The respective transition regions 10, 11 thus especially narrow proceeding from the diameter D2, D3 of the water entry region 4 or of the water exit region 5 to the diameter D1 of the adsorption and/or countercurrent zone 3.

With regard, moreover, to the water feed 8 of the countercurrent filter apparatus 1 of the invention, the latter should be arranged in such a way that the cross-sectional area defined by the opening of the water feed 8 is positioned at least essentially perpendicularly with respect to the longitudinal axis d of the countercurrent filter apparatus. In this way, the water can be led optimally into the apparatus.

Furthermore, it may be the case in accordance with the invention that the countercurrent filter apparatus 1, especially the water entry region 4, has at least one distributor unit 13. In this connection, the distributor unit 13, in terms of flow, should be disposed between the water feed 8 of the water entry region 4 and the adsorption and/or countercurrent zone 3 and/or between the water feed 8 of the water entry region 4 and the first transition region 10. Likewise, the distributor unit 13 should be disposed downstream of the water feed 8 and/or downstream of the adsorption material outlet 6, preferably downstream of the water feed 8 and the adsorption material outlet 6, based on the flow direction of the water. In other words, the distributor unit 13 is especially disposed upstream of the water feed 8 and/or the adsorption material exit 6, based on the transport direction of the adsorption material. The presence of a distributor unit 13 optimizes the entry of the water to be treated or purified into the adsorption or countercurrent zone 3, which further optimizes the filter performance of the countercurrent filter apparatus 1 of the invention.

In this connection, the distributor unit 13 should be at least essentially permeable and/or pervious to the water to be treated and/or purified. Moreover, the distributor unit 13 should be at least essentially permeable and/or pervious to the particulate adsorption material, meaning that the distributor unit 13 should have openings and/or pores larger than the particle size of the adsorption filter material, such that the spent adsorption material can get from the adsorption and/or countercurrent zone 3 to the outlet 6. For example, meshes and/or grids may be used.

In a further embodiment of the invention, the water feed 8 of the water entry region 4 may be equipped with a cover unit. More particularly, the water feed of the water entry region may have an assigned cover unit. In this connection, the cover unit, in terms of flow, should be disposed between the water feed of the water entry region and the adsorption and/or countercurrent zone and/or between the water feed of the water entry region and the first transition region. In addition, the cover unit should also be part of the distributor unit or be formed by the distributor unit. The cover unit especially prevents ingress of adsorption material into the water feed, especially if the countercurrent filter apparatus is not in operation or the feed stream of water has been interrupted.

In addition, the adsorption material outlet 6 should be disposed downstream of the water feed 8 of the water entry region 4, based on the transport direction of the adsorption material. In other words, the adsorption material outlet 6 should be disposed upstream of the water feed 8 of the water entry region 4, based on the flow direction of the water. In addition, the adsorption material outlet 6 should be disposed in an end section 12 of the water entry region 4. More particularly, the adsorption material outlet 6 should be disposed at a first end of the countercurrent filter apparatus 1.

According to the invention, it is additionally advantageous when the end section 12, in terms of flow, is disposed downstream of the water feed 8, based on the transport direction of the adsorption material. More particularly, the end section should be frustoconical and/or conical. In this connection, it is likewise advantageous in accordance with the invention when the end section narrows in the direction of the adsorption material outlet 6. In this manner, a funnel or collecting function is provided to some degree in relation to the adsorption material to be removed.

In addition, the adsorption material outlet 6 should be disposed in such a way that the cross-sectional area defined by the opening of the adsorption material outlet 6 is positioned at least essentially perpendicularly with respect to the longitudinal axis d of the countercurrent filter apparatus 1, which improves the removal of the adsorption material.

More particularly, the adsorption material inlet 7 should be disposed upstream of the water drain 9 of the water exit region 5. In addition, the water drain 9 of the water exit region 5 should be disposed downstream of the adsorption material inlet 7, based in each case on the flow direction of the water.

In the context of present invention, it may likewise be the case that the countercurrent filter apparatus 1, especially the water exit region 5, has at least one separator unit 14. In this connection, it may be the case that the separator unit 14, in terms of flow, is disposed between the water drain 9 of the water exit region 5 and the adsorption and/or countercurrent zone 3 and/or between the water drain 9 of the water exit region 5 and the second transition region 11.

In addition, the separator unit 14 should be disposed upstream of the water drain 9 and/or downstream of the adsorption material inlet 7, preferably upstream of the water drain 5 and downstream of the adsorbent inlet 7.

More particularly, the separator unit 14, in this connection, in terms of flow, should be disposed between the water drain 9 and the adsorption inlet 7.

The separator unit 14 especially prevents ingress of adsorption material into the water drain 9 or into the filtrate to be led away.

In this connection, the separator unit 14 should be at least essentially permeable and/or pervious to the water to be treated and/or purified. In addition, the separator unit 14 should be at least essentially impermeable and/or impervious to the particulate adsorption material.

It is likewise advantageous in accordance with the invention when the separator unit 14 comprises or consists of at least one filter element. This may, for example, be a filter web or the like. More particularly, the pore size or mesh size or the size of the passage orifices of the filter element should be less than the particle size or grain size of the adsorption material.

In addition, in the context of present invention, it may be the case that the adsorption material inlet 6 is disposed such that the cross-sectional area defined by the opening of the adsorption material inlet 6 is positioned at least essentially perpendicularly with respect to the longitudinal axis d of the countercurrent filter apparatus 1.

In a preferred embodiment of the invention, the countercurrent filter apparatus 1, especially in the operating state and/or use state, is arranged and/or aligned at least essentially vertically, based on the longitudinal axis d of the countercurrent filter apparatus 1. In this connection, the water entry region 4 is thus disposed at the bottom to some degree or forms a lower end. In this connection, the water exit region 5 is disposed at the top, so to speak, and/or forms an upper end.

In this embodiment, it may be the case in accordance with the invention that, in the operating state and/or use state, the water to be treated and/or purified flows and/or is conducted from the lower water entry region 4 through the adsorption and/or countercurrent zone 3 to the upper water exit region 5. More particularly, in the operating state and/or use state, the water to be treated and/or purified may flow and/or be conducted from the bottom and/or from the lower end through the adsorption and/or countercurrent zone 3 upward and/or to the upper end.

In addition, in this embodiment of the invention with the vertical positioning of the countercurrent filter apparatus 1, it may be the case that, in the operating state and/or use state, the adsorption material is conducted from the upper water exit region 5 through the adsorption and/or countercurrent zone 3 to the lower water entry region 4. More particularly, in the operating state and/or use state, the adsorption material should be conducted from the top and/or from the upper end through the adsorption and/or countercurrent zone downward and/or to the lower end.

With regard, furthermore, to the adsorption material in the countercurrent filter apparatus 1 of the invention, the adsorption material in the countercurrent filter apparatus 1, especially in the adsorption and/or countercurrent zone 3, should be in the form of a bed. The presence of the particulate adsorption material in the form of a bed, especially of a loose bed, is associated with the advantage that, firstly, optimal flow of the water to be treated or purified through the adsorption material is achieved and that, secondly, the adsorption material as such can be removed from the bed or added to the bed very efficiently.

On the basis of the specific apparatus configuration of the countercurrent filter apparatus 1 of the invention, it is possible to achieve very high superficial velocities or filtering rates: in this connection, the countercurrent filter apparatus 1 may be configured such that, in the operating state and/or use state, a superficial velocity and/or filtering rate, calculated as the quotient of volume flow rate [m³/h] and cross-sectional area [m²], based on the adsorption and/or countercurrent zone and based on the water to be treated and/or purified, of at least 10 m/h, especially at least 20 m/h, preferably at least 25 m/h, more preferably at least 30 m/h, is present and/or established.

More particularly, the countercurrent filter apparatus 1 is configured such that, in the operating state and/or use state, a superficial velocity and/or filtering rate, calculated as the quotient of volume flow rate [m³/h] and cross-sectional area [m], based on the adsorption and/or countercurrent zone and based on the water to be treated and/or purified, in the range from 10 m/h to 120 m/h, especially 20 m/h to 100 m/h, preferably 25 m/h to 80 m/h, more preferably 30 m/h to 70 m/h, especially preferably 40 m/h to 60 m/h, is present and/or established.

It is likewise possible, on the basis of the countercurrent filter apparatus 1 of the invention, also to set optimal mass throughputs: more particularly, it may be the case in this connection that the countercurrent filter apparatus 1 according to the invention is configured such that, in the operating state and/or use state, a mass throughput, especially a filtrate-specific mass throughput, calculated as the quotient of mass throughput of adsorption material in the countercurrent filter apparatus [g/h] and volume of purified water and/or filtrate produced [m³], in the range from $10^{-7}$ g/h·m³ to 1000 g/h·m³, especially $10^{-6}$ g/h·m to 100 g/h·m³, preferably $10^{-5}$ g/h·m³ to 10 g/h·m³, is present and/or established. On the basis of the countercurrent filter apparatus of the invention, it is thus possible that only small amounts of adsorption material are used for purification of water contaminated with trace substances or microcontaminants. The filtrate specific mass throughput can especially also be calculated by the general formula $V_{F,m} = m_{ads,D,AP}/V_F$ (with $V_{F,m}$: filtrate-specific mass throughput; $m_{ads,D,AP}$: mass throughput of the adsorption material in the countercurrent filter apparatus; $V_F$: volume of purified water and/or filtrate or filtrate volume produced).

Finally, FIG. 3 illustrates the principle that underlies the present invention of the opposite transport of water to be treated or purified on the one hand and of adsorption material on the other hand in the countercurrent filter apparatus 1 of the invention, especially countercurrent adsorption filter column, preferably as defined above, and the contacting of water and adsorption material, especially in the adsorption and/or countercurrent zone 3 of the countercurrent filter apparatus 1 according to the invention.

FIG. 3 additionally illustrates the flow or transport of the water W on the one hand and of the adsorption material AK on the other hand, in countercurrent to one another, that is present in the operating state or use state in the countercurrent filter apparatus 1. This involves flow of the water W to be treated proceeding from the water entry region 4 through the adsorption or countercurrent zone 3 into the water exit region 5, while the adsorption material flows or is transported proceeding from the water exit region 5 through the adsorption or countercurrent zone 3, in which the adsorption material is present preferably in the form of a loose bed 15, into the water entry region 4. By virtue of the adsorption material being fed to the bed 15, especially continuously, proceeding from the water exit region 5, and additionally being withdrawn from the bed 15, especially continuously, in the direction of the water entry region 4, there is exchange, especially continuous exchange, of the adsorption material in the bed 15 (more particularly simultaneously with the transport of the water), such that the bed 15 in effect is not exhausted and no operational interruptions are required for exchange of the adsorption material.

Further configurations, adaptations, variations, modifications, peculiarities and advantages of the present invention are immediately apparent to and implementable by the person skilled in the art on reading the description, without leaving the realm of the present invention.

The present invention is illustrated by the working examples which follow, but these are not intended to restrict the present invention in any way.

WORKING EXAMPLES

1. Performance of the Method of the Invention in a Preferred Embodiment of the Present Invention The method of the invention, in a specific embodiment of the present invention, can be conducted as described hereinafter:

The method of the invention can be conducted, for example, using a specific adsorption material in the form of spherical activated carbon, particularly using activated carbon in the form of PBSAC (polymer-based spherical activated carbon).

The method of the invention can especially be conducted with the aim of a preferably complete removal of trace substances from water to be purified or treated after passing through the countercurrent filter apparatus or adsorption stage used in accordance with the invention, and it is also possible to implement such a procedure, for example, in a drinking water works for treatment or purification of drinking water. The water to be treated or purified, which is fed to the countercurrent filter apparatus in the context of the procedure of the invention, can also be referred to synonymously as untreated water, while the purified water can be referred to correspondingly as filtrate.

With regard to the countercurrent filter apparatus used in the context of the method of the invention, in this preferred embodiment, the latter is, for example, a countercurrent filter apparatus as defined in the corresponding apparatus claims, which especially takes the form of a continuous countercurrent adsorption filter column. This corresponding countercurrent filter apparatus, in the context of the procedure of the invention, may especially be set up or operated at least essentially vertically, based on the longitudinal axis of the countercurrent filter apparatus, such that there is to some degree, and it is possible to define, an upper end and a lower end in relation to the countercurrent filter apparatus.

In this case, under operating conditions or use conditions, the (untreated) water to be treated or purified flows, especially under pressure, into the countercurrent filter apparatus, the water entering the countercurrent filter apparatus, to some degree, from the bottom or at the lower end of the countercurrent filter apparatus. In this connection, the countercurrent filter apparatus may have a distributor which conducts the (untreated) water to be treated or processed into an adsorption or countercurrent zone of the countercurrent filter apparatus.

At the same time, through an upper end of the countercurrent filter apparatus or from the top, regenerated or unladen adsorption material in the form of a specific activated carbon is fed to the countercurrent filter apparatus, and this can likewise be effected under pressure, in which case the pressure for this purpose of introducing the adsorption material should be greater than the pressure in the countercurrent filter apparatus or in the adsorption zone. The adsorption material subsequently passes, so to speak, into the adsorption or countercurrent zone from the top, in which it forms a bed, especially a loose bed, and wherein the adsorption material falls or is transported from the top downward, especially in the bed.

At the same time, the (untreated) water to be treated or purified flows from the bottom upward in the adsorption or countercurrent zone and hence in countercurrent to the adsorption material, such that the removal or adsorption of the trace substances or microcontaminants from the untreated water can take place in countercurrent. In this way, the water is freed of the contaminants and the adsorption material is laden with the contaminants, and the adsorption material having the highest loading of contaminants is correspondingly present in the lower region of the adsorption and/or countercurrent zone.

The water which has been purified, i.e. freed of the trace substances or micropollutants, can subsequently, through a mechanical separating apparatus, enter the upper region or the upper end and hence, as it were, the top of the countercurrent filter apparatus, and it is possible to discharge or lead off the purified water from this region for further use, for example as drinking water.

Any separating apparatus present in the countercurrent filter apparatus serves especially to retain the adsorption material, and the separating apparatus for this purpose may take the form, for example, of a filter web or wire mesh.

At the other end and hence, as it were, in the lower region or at the foot of the countercurrent filter apparatus, the adsorption material laden with the contaminants may be withdrawn, for example using a jet pump, peristaltic pump or the like.

Subsequently, the laden adsorption material can be fed to a desorption apparatus or regeneration apparatus which may comprise several aggregates or units.

In this connection, it may be the case, for example, that the adsorption material, prior to drying, is freed of the adhering moisture or of residual water, for example by means of an inclined clarifier or belt drier. Subsequently, the adsorption material can be subjected to an additional main drying operation, in which case it is possible to use, for example, belt driers and/or fluidized bed driers. In this way, it is especially possible to remove residual moisture present in the pore volume or space of the adsorption material.

By means of a mechanical conveying unit, for example in the form of a vibrating channel, a pneumatic conveyor or a conveyor belt, it is possible to feed the adsorption material thus dried and laden with the pollutants to a thermal regeneration. For this purpose, it is possible to use, for example, units in the form of a rotary oven, especially an indirectly heated rotary oven, a high-temperature fluidized bed unit or a microwave oven. In the thermal regeneration, the contaminants are driven out of or removed from the adsorption material with the aid of thermal energy, such that the corresponding micropollutants are desorbed. The desorbed substances are especially in the gaseous state and can be sent to a thermal final utilization, especially an incineration. The adsorption material is to some degree returned or converted back to the original state or to an unladen state by the thermal regeneration, and so the adsorption capacity of the adsorption material is restored.

The unladen adsorption material thus recycled can be stored intermediately, for example, in a reservoir apparatus and wetted with water by means of a suitable moistening or conveying unit, such as a jet pump and/or a peristaltic pump, and fed back to the countercurrent filter apparatus, especially under pressure.

Because of the procedure of the invention, it is possible overall to achieve a small circulation factor in relation to the purifying plant used, meaning that a relatively large portion of the adsorption material used in the context of the procedure of the invention is in the countercurrent filter apparatus during the procedure, and only a relatively small portion of the adsorption material is in the regeneration step, which is associated with advantages in terms of process technology, since a high proportion of the adsorption material can fulfill the process-specific purpose of the purification of water. It is likewise possible, because of the procedure of the invention, to achieve high specific mass throughputs, since large volumes of filtrate can be produced in relation to the amount of adsorption material used.

2. Studies of the Efficiency of the Purification Plant of the Invention and of the Countercurrent Filter Apparatus of the Invention a1) The performance of the purification plant of the invention and of the countercurrent filter apparatus of the invention in relation to the purification of contaminated untreated water is examined hereinafter in prolonged operation. The water to be treated or purified contains, on average, the following contaminants or trace substances:

TABLE 1

Trace substances in the water to be treated or purified (untreated water)

| Name | Mean concentration at the inlet of the countercurrent filter apparatus | Unit |
| --- | --- | --- |
| Amidotrizoic acid | 290 | ng/l |
| Iopamidol | 97 | ng/l |
| Perfluorooctane-sulfonate (PFOS) | 260 | |
| Methyl tert-butyl ether (MTBE) | 0.57 | µg/L |
| Dissolved organic carbons (DOC) | 0.4-0.7 | mg/L |

The countercurrent filter apparatus used, especially as defined above, has a height H1 of about 3.50 m with a diameter D2 and D3 of the water entry region and water exit region respectively of about 1.60 m. The spatial dimensions of the cylindrical adsorption or countercurrent zone of the countercurrent filter apparatus are additionally 1.75 m for the height H1 and 0.8 m for the diameter D1. The volume of the random bed of the activated carbon used in the countercurrent filter apparatus is about 0.85 m³.

The adsorption material used is a specific particulate activated carbon (PBSAC) having a pore volume according to Gurvich of 1.124 cm³/g and an abrasion hardness of 98.7%.

The superficial velocity or filtering rate is set to a value of about 55 m/h.

In addition, the countercurrent filter apparatus according to the invention or the purification plant of the invention was run with a circulation factor, calculated as the quotient of the amount of the adsorption material present in the regeneration or recycling operation and the amount of the adsorption material present in the countercurrent filter apparatus, of about 10.

In addition, the countercurrent filter apparatus of the invention is operated with a specific mass throughput, calculated as the quotient of mass throughput of adsorption material and volume of treated or purified water or filtrate produced, of about 5 g/h·m³.

The purification plant used additionally contains a first drying or demoistening unit in the form of an inclined clarifier, a second drying or demoistening unit in the form of a belt drier, and a third main drying or demoistening unit in the form of a fluidized bed drier, arranged in succession.

Connected downstream of the corresponding drying or demoistening units is a regeneration or desorption unit in the form of an indirectly heated rotary oven.

The purification plant additionally has a reservoir unit connected downstream of the regeneration or desorption unit and a moistening or transport unit in the form of a water-jet pump, connected downstream in turn of the regeneration or desorption unit.

The adsorbent laden with the contaminants withdrawn from the countercurrent filter apparatus is passed through the corresponding drying or demoistening units, with the residual moisture content of the adsorption material thus dried of about 0.8% by weight, based on the adsorption material.

Subsequently, the adsorption material is transferred into the regeneration or desorption unit. Thermal treatment is effected therein, accompanied by the desorption of the previously adsorbed contaminants.

The purified or regenerated or fresh adsorption material thus obtained is stored intermediately in the reservoir apparatus, and subsequently moistened with the moistening or transport unit, likewise using the underlying untreated water for this purpose, and subsequently fed back to the countercurrent filter apparatus.

With regard, moreover, to the treated or purified water or filtrate withdrawn from the countercurrent filter apparatus, the latter was analyzed continuously during the entire experimental or operating periods for any breakthroughs of the underlying contaminants.

No breakthrough at all was found for an experimental or operating period of 7 days; the filtrate obtained was free of the above-cited contaminants for the entire period.

a2) The experiment set out in section a1) is repeated, except using a countercurrent filter apparatus in which the diameter D1 of the adsorption or countercurrent zone corresponds to the respective diameters D2 and D3 of the water entry region and the water exit region, such that the overall result is a cylindrical countercurrent filter apparatus with no narrowing. At a superficial velocity or filtering rate of 55 m/h, a breakthrough is detected for amidotrizoic acid after an operating time of about 118 h. The breakthrough time for iopamidol is about 125 h, while a breakthrough time of 115 h is determined for PFOS. In relation to MTBE, a breakthrough can be ascertained after 72 h. For the DOC contaminants, the breakthrough time is about 65 h. At a reduced superficial velocity or filtering rate of 10 m/h, no breakthrough can be detected over the experimental and operating period of 7 days. In addition, it is possible to observe that the bed of the activated carbon is not entirely homogeneous or uniform.

b) In the context of a corresponding comparison, a noninventive filter apparatus in the form of a filter system which is closed in relation to the adsorption material is used. The comparative filter apparatus has a height of 2 m and a diameter of 1.50 m and contains activated carbon in the form of a random bed having a volume of 0.85 m³, which is not exchanged over the course of the experiment. The adsorption material used is a particulate granular carbon. The system is operated with a superficial velocity or filtering rate of 8 m/h, using the above-defined untreated water contaminated with the corresponding contaminants in this connection. In relation to amidotrizoic acid, it was possible to identify a breakthrough after about 38 h of operating time. The breakthrough time for iopamidol is about 40 h, while a breakthrough time of 42 h is determined for PFOS. In relation to MTBE, a breakthrough can be ascertained after only 17 h. For the DOC contaminants, the breakthrough time is about 21 h.

The studies laid out above show the excellent filter properties of the inventive design based on the purification plant of the invention and the countercurrent filter apparatus of the invention, and the corresponding method of the invention, wherein in this connection in relation to contaminated untreated water excellent purification to obtain a pollutant-free filtrate.

3. Studies of Adsorptive Removal of Trace Substances for Various Adsorbents

In addition, the breakthrough characteristics are ascertained for relevant trace contaminants on various adsorbents in a half-scale pilot plant.

To assess the adsorption characteristics of various trace contaminants, an activated carbon filter plant composed of four parallel filter columns is set up, the respective filter columns (filters 1 to 4) having a diameter of 0.095 m with a corresponding area of 0.07 $m^2$. The adsorption material to be examined was used in a bed height of about 1.27 m in each case, with variation in the corresponding amounts of activated carbon between 3.2 and 5.5 kg. The adsorption material is not exchanged over the experimental or operating period. The respective filter columns are operated with a superficial velocity or filtering rate of 10 m/h. The first filter column was operated with a specifically commercially available granulated carbon, while the second to fourth filter columns are operated with activated carbon in the form of PBSAC, as shown in table 2; with regard to the activated carbon PBSAC I to III, PBSAC I has the lowest activation level and PBSAC II the highest.

TABLE 2

Product specifications of the adsorbents

|  | Filter 1 | Filter 2 | Filter 4 | Filter 3 |
|---|---|---|---|---|
| Adsorbent | conventional granular carbon | PBSAC I | PBSAC II | PBSAC III |
| BET $m^2/g$ | 850 | 1506 | 1733 | 2084 |
| Iodine number mg/g | 850 | 1400 | 1584 | 1767 |
| Particle size mm | 0.5-2.6 | about 0.5 | about 0.45 | about 0.45 |
| Tapped density $kg/m^3$ | 460 | 535 | 479 | 355 |
| Ash content wt. % | 1.2 | 0.8 | 0.2 | 0.3 |

The feed to the pilot plant is ultrapure water, into which is metered a mixture of various trace substances from a reservoir vessel. For this purpose, amidotrizoic acid, iopamidol, PFOS, DMS, MTBE and EDTA were metered in. Table 3 shows the mean feed concentration of the trace substances:

TABLE 3

Mean feed concentration of the trace substances

|  | Mean value of feed concentration |
|---|---|
| Amidotrizoic acid | 290 ng/L |
| Iopamidol | 97 ng/L |
| PFOS | 260 ng/L |
| MTBE | 3.9 µg/L |
| N,N-Dimethylsulfamide (DMS) | 0.8 µg/L |

For the individual trace contaminants, the respective breakthrough curves are determined, assuming a relative concentration of 0.1 as the respective limit for the breakthrough (i.e. quotient of effluent concentration and feed concentration). The specific throughput (amount of water throughput per kg of adsorbent) functions as the breakthrough time. The following table shows the values determined in this way:

TABLE 4

Breakthrough characteristics of the respective trace contaminants (breakthrough at specific throughput $[m^3/kg]$):

| Activated carbon | Filter 1 conventional granular carbon | Filter 2 PBSAC I | Filter 4 PBSAC II | Filter 3 PBSAC III |
|---|---|---|---|---|
| Amidotrizoic acid | 10 | 25 | 40 | 225 |
| Iopamidol | 17 | 54 | 82 | 264 |
| PFOS | 20 | 38 | 60 | >234 |
| MTBE | >5 | 15 | 37 | 35 |
| DMS | >5 | 7 | 8 | 7 |

Table 4 illustrates that the activated carbons based on PBSAC I to III having the specifications cited in table 2 have significantly better breakthrough characteristics than the conventional granular carbon. Activated carbons of this kind are particularly suitable for the method of the invention or for use in the purification plant of the invention or the countercurrent filter apparatus of the invention. Moreover, it should be stated in relation to the present comparative study that the adsorption material in the form of the conventional granular carbon used which was removed after purification had ended exhibits distinct abrasion, associated with sludge formation.

The present studies thus show, overall, the excellent properties of the method of the invention and of the corresponding purification plant and countercurrent filter apparatus of the invention. In addition, the superiority of the adsorbents used with preference in accordance with the invention is demonstrated.

LIST OF REFERENCE NUMERALS

A purification plant
RV regeneration apparatus
T1 drying and/or demoistening unit
T2 drying and/or demoistening unit
T3 drying and/or demoistening unit
R regeneration and/or desorption unit
V reservoir apparatus unit
B moistening unit
AK adsorption material transport
W water flow and/or stream
AW water to be treated or purified
Fl purified water or filtrate
1 countercurrent filter apparatus
2 housing
3 adsorption and/or countercurrent zone
4 water entry region
5 water exit region
6 adsorption material outlet
7 adsorption material inlet
8 water feed
9 water drain 10 first transition region
11 second transition region
12 end section of the water entry region
13 distributor unit
14 separator unit
15 bed of the adsorption material
H1 height of the adsorption and/or countercurrent zone
D1 diameter of the adsorption and/or countercurrent zone
H2 total height of the countercurrent filter apparatus
D2 diameter of the water entry region
D3 diameter of the water exit region
a cross section or cross-sectional area of the adsorption and/or countercurrent zone
b cross section or cross-sectional area of the water entry region
c cross section or cross-sectional area of the water exit region
d longitudinal axis of the countercurrent filter apparatus While Applicant's invention has been described in detail above with reference to specific embodiments, it will be understood that modifications and alterations in embodiments disclosed may be made by those practiced in the art without departing from the spirit and scope of the invention. All such modifications and alterations are intended to be covered.

The invention claimed is:

1. A countercurrent filter apparatus for treatment or purification of water for the purpose of adsorptive removal of inorganic-based or organic-based contaminants, which countercurrent filter is designed for uptake, storage and release of at least one particulate adsorption material;
   wherein the countercurrent filter apparatus comprises at least one housing, said housing comprising at least one adsorption zone having a diameter D1 and a height H1, at least one water entry region having a diameter D2 and at least one water exit region having a diameter D3,
   wherein the apparatus is adapted, during operation, to provide a flow and a flow direction of the water being treated, the flow direction being from the water entry region to the water exit region,
   wherein the adsorption or countercurrent zone, in terms of flow, is disposed between the water entry region and the water exit region and wherein the adsorption or countercurrent zone is disposed downstream of the water entry region and upstream of the water exit region, based on the flow direction of the water,
   wherein the water entry region comprises at least one water feed and at least one adsorption material outlet and wherein the water exit region comprises at least one water drain and least one adsorption material inlet,
   a ratio D1:D2 is in the range from 1:1.1 to 1:5 and
   wherein a ratio D1:D3 is in the range from 1:1.1 to 1:5; and
   wherein the countercurrent filter apparatus has a first transition region and a second transition region,
      wherein the first transition region, in terms of flow, is disposed between the water entry region and the adsorption zone and wherein the first transition region is disposed downstream of the water entry region and upstream of the adsorption zone, based on the flow direction of the water,
      wherein the first transition region is conical and, proceeding from the water entry region having the diameter D2, narrows at adsorption zone having the diameter D1,
      wherein the second transition region, in terms of flow, is disposed between the water exit region and the adsorption and wherein the second transition region is disposed downstream of the adsorption zone and upstream of the water exit region, based on the flow direction of the water,
      wherein the second transition region is conical and, proceeding from the water exit region having the diameter D3, narrows in the direction of at the adsorption or countercurrent zone having the diameter D1, and
      wherein the water entry region of countercurrent filter apparatus comprises at least one distributor unit, and
      wherein the distributor unit, in terms of flow, is disposed between the water feed of the water entry region and the adsorption zone and between the water feed of the water entry region and the first transition region.

2. The countercurrent filter apparatus as claimed in claim 1, including a bed of adsorption material in the adsorption zone and water to be treated in the bed of adsorption material,
   wherein, in the operating state, in the adsorption zone, the water to be treated and the adsorption material move in opposite directions relative to one another.

3. The countercurrent filter apparatus as claimed in claim 1, wherein a ratio H1:D1 is in the range from 1.5:1 to 20:1.

4. The countercurrent filter apparatus as claimed in claim 1,
   wherein the adsorption zone has an at least essentially round cross section a;
   wherein the water entry region has an at least essentially round cross section b;
   wherein the water exit region has an at least essentially round cross section c;
   wherein the cross-sectional area a of the adsorption zone is less than the cross-sectional area b of the water entry region and less than the cross-sectional area c of the water exit region; and
   wherein the cross-sectional area b of the water entry region and the cross-sectional area c of the water exit region are at least essentially of equal size.

5. The counter current filter apparatus as claimed in claim 1,
   wherein the filter apparatus is adapted to provide a transport direction for the adsorption material from the adsorption material inlet to the adsorption material outlet;
   wherein the adsorption material outlet is disposed downstream of the water feed of the water entry region based on the transport direction for the adsorption material and wherein the adsorption material outlet is disposed in an end section of the water entry region, based on the transport direction for the adsorption material.

6. The countercurrent filter apparatus as claimed in claim 1
   wherein the adsorption material inlet is disposed upstream of the water drain of the water exit region based on the flow direction of the water and wherein the water drain of the water exit region is disposed downstream of the adsorption material inlet, based in on the flow direction of the water.

7. The countercurrent filter apparatus as claimed in claim 1,
   wherein the water exit region of the counter current filter apparatus comprises at least one separator unit,
   wherein the separator unit, in terms of flow, is disposed between the water drain of the water exit region and the adsorption zone and between the water drain of the water exit region and the second transition region.

8. The countercurrent filter apparatus as claimed in claim 1, including a bed of particulate adsorption material in the adsorption zone,
wherein in the operating state, the particulate adsorption material in the adsorption zone of the countercurrent filter apparatus is in the form of a loose bed.

9. A purification plant for treatment or purification of water for the purpose of adsorptive removal of inorganic-based or organic-based contaminants, wherein the plant comprises:
at least one countercurrent filter apparatus according to claim 1,
wherein, in the operating state, the water to be treated and purified and the adsorption material are conducted in countercurrent directions to one another in the countercurrent filter apparatus,
wherein the countercurrent filter apparatus comprises said at least one housing, said housing comprising at least one adsorption zone and said at least one water entry region and said at least one water exit region,
wherein the adsorption or countercurrent zone, in terms of flow, is disposed between the water entry region and the water exit region and wherein the adsorption zone is disposed downstream of the water entry region and upstream of the water exit region, based on the flow direction of the water, and
wherein the water entry region comprises said at least one adsorption material outlet and wherein the water exit region comprises said at least one adsorption material inlet;
optionally at least one drying or demoistening unit for drying or demoistening of adsorption material laden with contaminants, wherein the drying or demoistening unit is disposed downstream of the countercurrent filter apparatus, based on a transport direction of the adsorption material;
at least one regeneration or desorption unit for regeneration of adsorption material laden with contaminants and for provision of regenerated and unladen adsorption material, wherein the regeneration and/or desorption unit is disposed downstream of the countercurrent filter apparatus and downstream of the optional drying or demoistening unit, based in each case on the transport direction of the adsorption material;
optionally at least one moistening unit for moistening of regenerated or unladen or fresh adsorption material, wherein the moistening unit is disposed downstream of the regeneration or desorption unit, based in each case on the transport direction of the adsorption material.

10. The purification plant as claimed in claim 9, wherein the drying or demoistening unit is selected from the group of belt driers, fluidized bed driers and inclined clarifiers and combinations thereof;
wherein the regeneration or desorption unit is selected from the group of rotary ovens, belt ovens, fluidized bed driers, and microwave ovens; and
wherein the moistening unit is selected from the group of stirred tanks, spray towers, belt moisteners, water-jet pumps, peristaltic pumps and combinations thereof.

11. The purification plant as claimed in claim 9, wherein the purification plant also comprises at least one reservoir unit, and wherein the reservoir unit is disposed downstream of the regeneration or desorption unit and upstream of the moistening unit, based on the transport direction of the adsorption material.

12. A method for treatment or purification of water for the purpose of adsorptive removal of inorganic-based or organic-based contaminants, wherein, in a countercurrent filter apparatus according to claim 1, water to be treated and purified, on the one hand, and a particulate adsorption material, on the other hand are conducted in countercurrent to one another in such a way that the water to be treated and purified is passed through a bed of the adsorption material present in the countercurrent filter apparatus for adsorptive removal of the contaminants and the bed is exchanged and regenerated by removal and supply of the adsorption material in countercurrent to the water to be treated.

13. The method as claimed in claim 12, wherein the adsorption material is introduced continuously into the countercurrent filter apparatus and wherein the adsorption material is removed continuously from the countercurrent filter apparatus;
wherein the adsorption material removed from the countercurrent filter apparatus is sent and subjected to a continuous thermal regeneration operation with desorption of the contaminants, wherein the regenerated adsorption material is introduced continuously back into the countercurrent filter apparatus;
wherein water to be treated and purified is introduced continuously into the countercurrent filter apparatus in the water entry region and wherein the treated and purified is removed continuously from the countercurrent filter apparatus; and
wherein the adsorption material is introduced continuously into the countercurrent filter apparatus in the water exit region and wherein the adsorption material is removed continuously from the countercurrent filter apparatus in the water exit region.

14. The method as claimed in claim 12,
wherein water to be treated and purified, on the one hand, and the adsorption material, on the other hand, in the countercurrent filter apparatus have at least essentially opposing flow directions and are contacted with one another in countercurrent to one another in the countercurrent filter apparatus.

15. The method as claimed in claim 12, wherein water to be treated and purified which is introduced into the countercurrent filter apparatus is conducted through the adsorption zone of the countercurrent filter apparatus disposed downstream of the water entry region of the countercurrent filter apparatus, based on the flow direction of the water.

16. The method as claimed in claim 12, wherein a filtering rate, calculated as the quotient of volume flow rate [m3/h] and cross-sectional area [m2] and based on the water to be treated and purified, of at least 10 m/h is established in the adsorption zone of the countercurrent filter apparatus.

17. The method as claimed in claim 12,
wherein the adsorption material is fed at least essentially continuously to the countercurrent filter apparatus and wherein the adsorption material is conducted at least essentially continuously through the countercurrent filter apparatus and wherein the adsorption material is withdrawn at least essentially continuously from the countercurrent filter apparatus;
wherein the adsorption material introduced into the countercurrent filter apparatus is conducted through an adsorption zone of the countercurrent filter apparatus disposed downstream of the water exit region of the countercurrent filter apparatus, based on the flow direction of the adsorption material;

wherein the adsorption material is present in the countercurrent filter apparatus in the form of a loose bed; and wherein the adsorption material, after passing through the adsorption zone of the countercurrent filter apparatus, is removed from the countercurrent filter apparatus in the water entry region disposed downstream of the water exit region of the countercurrent filter apparatus and downstream of the adsorption zone of the countercurrent filter apparatus, based on the flow direction of the adsorption material.

18. The method as claimed in claim 12, wherein the adsorption material is selected from the group of particulate adsorption materials selected from the group of:
   (i) activated carbon;
   (ii) zeolites;
   (iii) molecular sieves;
   (iv) metal oxide or metal particles;
   (v) ion exchange resins;
   (vi) inorganic oxides;
   (vii) porous organic polymers, porous organic-inorganic hybrid polymers, metal-organic framework materials (MOFs), covalent organic frameworks materials (COFs), zeolite imidazolate frameworks materials (ZIFs), polymer organic materials (POMs) and OFCs;
   (viii) mineral granulates;
   (ix) clathrates; and
   (x) mixtures thereof.

19. The method as claimed in claim 12, wherein the adsorption material is formed from granular activated carbon.

* * * * *

UNITED STATES PATENT AND TRADEMARK OFFICE
CERTIFICATE OF CORRECTION

PATENT NO. : 10,093,555 B2
APPLICATION NO. : 14/777178
DATED : October 9, 2018
INVENTOR(S) : Raik Schönfeld et al.

Page 1 of 1

It is certified that error appears in the above-identified patent and that said Letters Patent is hereby corrected as shown below:

In the Claims

Column 43, Line 66, please insert --the-- after "at".

Signed and Sealed this
Fifth Day of February, 2019

Andrei Iancu
*Director of the United States Patent and Trademark Office*